United States Patent
Sethi et al.

(10) Patent No.: US 12,474,943 B2
(45) Date of Patent: Nov. 18, 2025

(54) MACHINE LEARNING BASED PREDICTIONS OF UPGRADE TESTING OUTCOMES FOR INFORMATION TECHNOLOGY ENVIRONMENTS

(71) Applicant: Dell Products L.P., Round Rock, TX (US)

(72) Inventors: Parminder Singh Sethi, Ludhiana (IN); Shelesh Chopra, Bangalore (IN); Kanika Kapish, Muzaffarnagar (IN)

(73) Assignee: DELL PRODUCTS L.P., Round Rock, TX (US)

( * ) Notice: Subject to any disclaimer, the term of this patent is extended or adjusted under 35 U.S.C. 154(b) by 988 days.

(21) Appl. No.: 17/570,423

(22) Filed: Jan. 7, 2022

(65) Prior Publication Data
US 2023/0221973 A1 Jul. 13, 2023

(51) Int. Cl.
*G06F 9/455* (2018.01)
*G06F 8/65* (2018.01)
*G06F 8/71* (2018.01)

(52) U.S. Cl.
CPC ............ *G06F 9/45558* (2013.01); *G06F 8/65* (2013.01); *G06F 8/71* (2013.01); *G06F 2009/45562* (2013.01)

(58) Field of Classification Search
None
See application file for complete search history.

(56) References Cited

U.S. PATENT DOCUMENTS

| | | |
|---|---|---|
| 8,522,083 B1 | 8/2013 | Cohen et al. |
| 2007/0271561 A1 | 11/2007 | Winner et al. |
| 2009/0100420 A1 | 4/2009 | Sapuntzakis et al. |
| 2009/0241099 A1 | 9/2009 | Lee et al. |
| 2011/0066786 A1 | 3/2011 | Colbert |
| 2011/0296248 A1 | 12/2011 | Vidal et al. |
| 2012/0054728 A1 | 3/2012 | Rohde et al. |
| 2015/0347264 A1 | 12/2015 | Mohammed et al. |
| 2016/0117163 A1 | 4/2016 | Fukui et al. |
| 2017/0034023 A1 | 2/2017 | Nickolov et al. |
| 2017/0255460 A1 | 9/2017 | Frank et al. |
| 2019/0339958 A1 | 11/2019 | Joshi et al. |

(Continued)

*Primary Examiner* — Bing Zhao
(74) *Attorney, Agent, or Firm* — Chamberlain, Hrdlicka, White, Williams & Aughtry; Aly Z. Dossa

(57) ABSTRACT

A method and system for machine learning based predictions of upgrade testing outcomes for information technology (IT) environments. At least with respect to computing, an upgrade may entail the replacement of a product—in the form of hardware, software, and/or firmware—with a newer or better version, which may serve to bring the product up to date, improve the characteristic(s) of the product, and/or resolve any issue(s) inflicting the product. Further, through the process of upgrade testing, an upgrade may be assessed to determine its impact on an operability of varying environments following application of the upgrade thereon. Moreover, each environment may reflect a different history of product upgrades that had been applied thereon prior to the upgrade being tested. The disclosed method and system, accordingly, propose a framework directed to ascertaining the post-upgrade outcomes of actual IT environments using machine learning applied to post-upgrade outcomes of simulated IT environments.

11 Claims, 12 Drawing Sheets

(56) References Cited

U.S. PATENT DOCUMENTS

| | | |
|---|---|---|
| 2020/0034133 A1* | 1/2020 | Dattatri .................. G06F 8/65 |
| 2021/0004000 A1 | 1/2021 | Kalaskar et al. |
| 2021/0255847 A1 | 8/2021 | Jean-louis et al. |
| 2021/0334195 A1 | 10/2021 | Sethi et al. |
| 2022/0035905 A1 | 2/2022 | Lu et al. |
| 2022/0075613 A1* | 3/2022 | Ramachandran ... G06F 9/45558 |
| 2023/0099186 A1 | 3/2023 | Virtuoso |
| 2023/0115707 A1 | 4/2023 | Khan |

* cited by examiner

MACHINE LEARNING BASED PREDICTIONS OF UPGRADE TESTING OUTCOMES FOR INFORMATION TECHNOLOGY ENVIRONMENTS

BACKGROUND

At least with respect to computing, an upgrade may entail the replacement of a product—in the form of hardware, software, and/or firmware—with a newer or better version, which may serve to bring the product up to date, improve the characteristic(s) of the product, and/or resolve any issue(s) inflicting the product.

SUMMARY

In general, in one aspect, the invention relates to a method for predicting upgrade outcomes entailing prospective product upgrades on enterprise information technology (IT) environments. The method includes obtaining virtual machine feature information for a virtual machine group; applying a machine learning algorithm to the virtual machine feature information to produce an analytic subspace; identifying, within the analytic subspace, a plurality of upgrade prediction groups; projecting, for a customer environment, customer environment feature information onto the analytic subspace to select an upgrade prediction group of the plurality of upgrade prediction groups; and inferring an upgrade recommendation based on the upgrade prediction group.

In general, in one aspect, the invention relates to a non-transitory computer readable medium (CRM). The non-transitory CRM includes computer readable program code, which when executed by a computer processor, enables the computer processor to perform a method for predicting upgrade outcomes entailing prospective product upgrades on enterprise information technology (IT) environments. The method includes obtaining virtual machine feature information for a virtual machine group; applying a machine learning algorithm to the virtual machine feature information to produce an analytic subspace; identifying, within the analytic subspace, a plurality of upgrade prediction groups; projecting, for a customer environment, customer environment feature information onto the analytic subspace to select an upgrade prediction group of the plurality of upgrade prediction groups; and inferring an upgrade recommendation based on the upgrade prediction group.

In general, in one aspect, the invention relates to a system. The system includes a customer environment; and an analysis farm operatively connected to the customer environment, and including a computer processor, wherein the computer processor is configured to perform a method for predicting upgrade outcomes entailing prospective product upgrades on enterprise information technology (IT) environments. The method includes obtaining virtual machine feature information for a virtual machine group; applying a machine learning algorithm to the virtual machine feature information to produce an analytic subspace; identifying, within the analytic subspace, a plurality of upgrade prediction groups; projecting, for the customer environment, customer environment feature information onto the analytic subspace to select an upgrade prediction group of the plurality of upgrade prediction groups; and inferring an upgrade recommendation based on the upgrade prediction group.

Other aspects of the invention will be apparent from the following description and the appended claims.

DETAILED DESCRIPTION

Figure 1A:
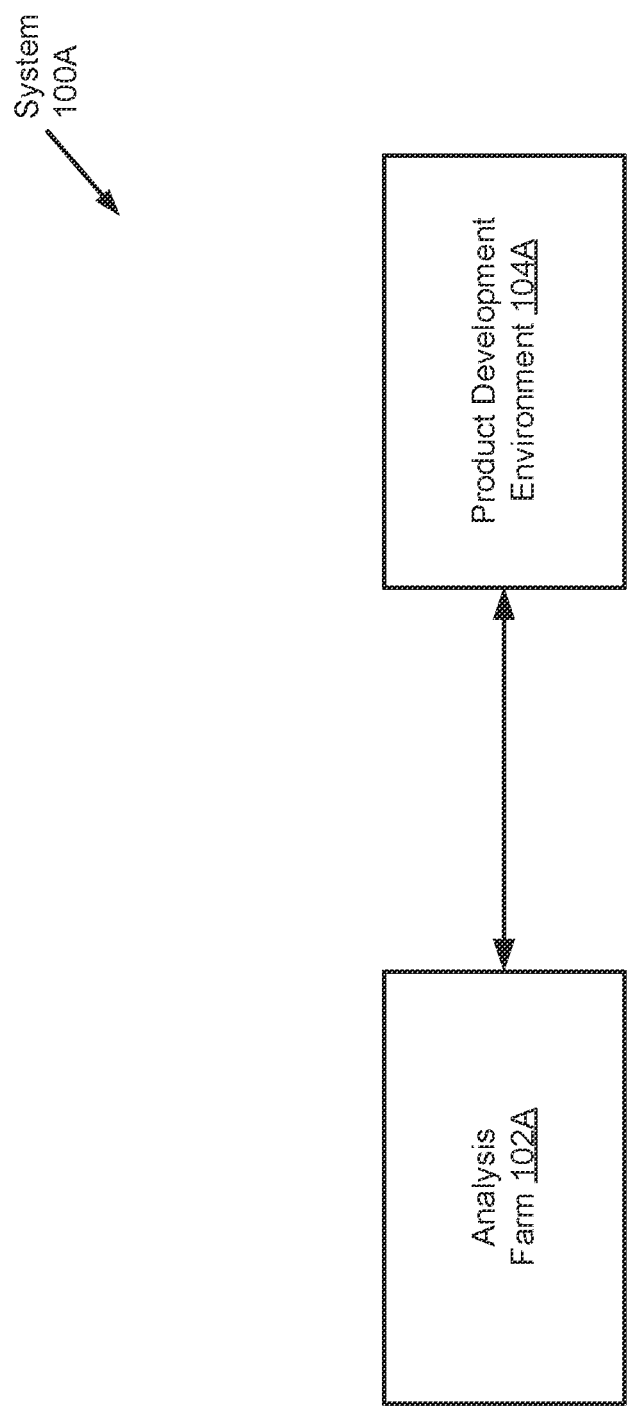
FIG. 1A shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for machine learning based predictions of upgrade testing outcomes for information technology (IT) environments. At least with respect to computing, an upgrade may entail the replacement of a product—in the form of hardware, software, and/or firmware—with a newer or better version, which may serve to bring the product up to date, improve the characteristic(s) of the product, and/or resolve any issue(s) inflicting the product. Further, through the process of upgrade testing, an upgrade may be assessed to determine its impact on an operability of varying environments following application of the upgrade thereon. Moreover, each environment may reflect a different combination or history of product versions (i.e., upgrades) that had been applied thereon prior to the upgrade being tested. The disclosed method and system, accordingly, propose a framework directed to ascertaining the post-upgrade outcomes of actual IT environments using machine learning applied to post-upgrade outcomes of simulated IT environments.

FIG. 1A shows a system in accordance with one or more embodiments of the invention. The system (100A) may include an analysis farm (102A) operatively connected to a product development environment (104A). Each of these system (100A) components is described below.

In one embodiment of the invention, the analysis farm (102A) may represent any information technology (IT) environment designed and configured to conduct upgrade testing (described above) within simulated IT environments. To that extent, the analysis farm (102A) may include functionality to perform the method outlined in FIGS. 4A-4C, below. One of ordinary skill will appreciate that the analysis farm (102) may perform other functionalities without departing from the scope of the invention. Further, the analysis farm (102A) may be implemented using one or more network servers (not shown). Each network server may encompass a physical or a virtual network server, which may reside in an on-premises data center, a cloud computing environment, or a hybrid infrastructure thereof. Additionally, or alternatively, the analysis farm (102A) may be implemented using one or more computing systems similar to the exemplary computing system shown in FIG. 6. The analysis farm (102A), moreover, is described in further detail below with respect to FIG. 2A.

In one embodiment of the invention, the product development environment (104A) may represent any IT environment designed and configured to develop IT-pertinent products—in the form of hardware, software, and/or firmware—including any revisions or versions thereof. To the extent of embodiments of the invention disclosed herein, the product development environment (104A) may include functionality to: submit upgrades (also referred to hereinafter as product versions of products), sought to be tested, to the analysis farm (102A); and receive issue reports, detailing results of the upgrade tests, from the analysis farm (102A). One of ordinary skill will appreciate that the product development environment (104A) may perform other functionalities without departing from the scope of the invention. Further, the product development environment (104A) may be implemented using one or more network servers (not shown). Each network server may encompass a physical or a virtual network server, which may reside in an on-premises data center, a cloud computing environment, or a hybrid infrastructure thereof. Additionally, or alternatively, the product development environment (104A) may be implemented using one or more computing systems similar to the exemplary computing system shown in FIG. 6.

In one embodiment of the invention, the above-mentioned system (100A) components may communicate with one another through a network (not shown) (e.g., a local area network (LAN), a wide area network (WAN) such as the Internet, a mobile network, any other communication network type, or a combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100A) components. Moreover, in communicating with one another, the above-mentioned system (100A) components may employ any combination of wired and/or wireless communication protocols.

While FIG. 1A shows a configuration of components, other system (100A) configurations may be used without departing from the scope of the invention. For example, refer to FIG. 1B.

Figure 1B:
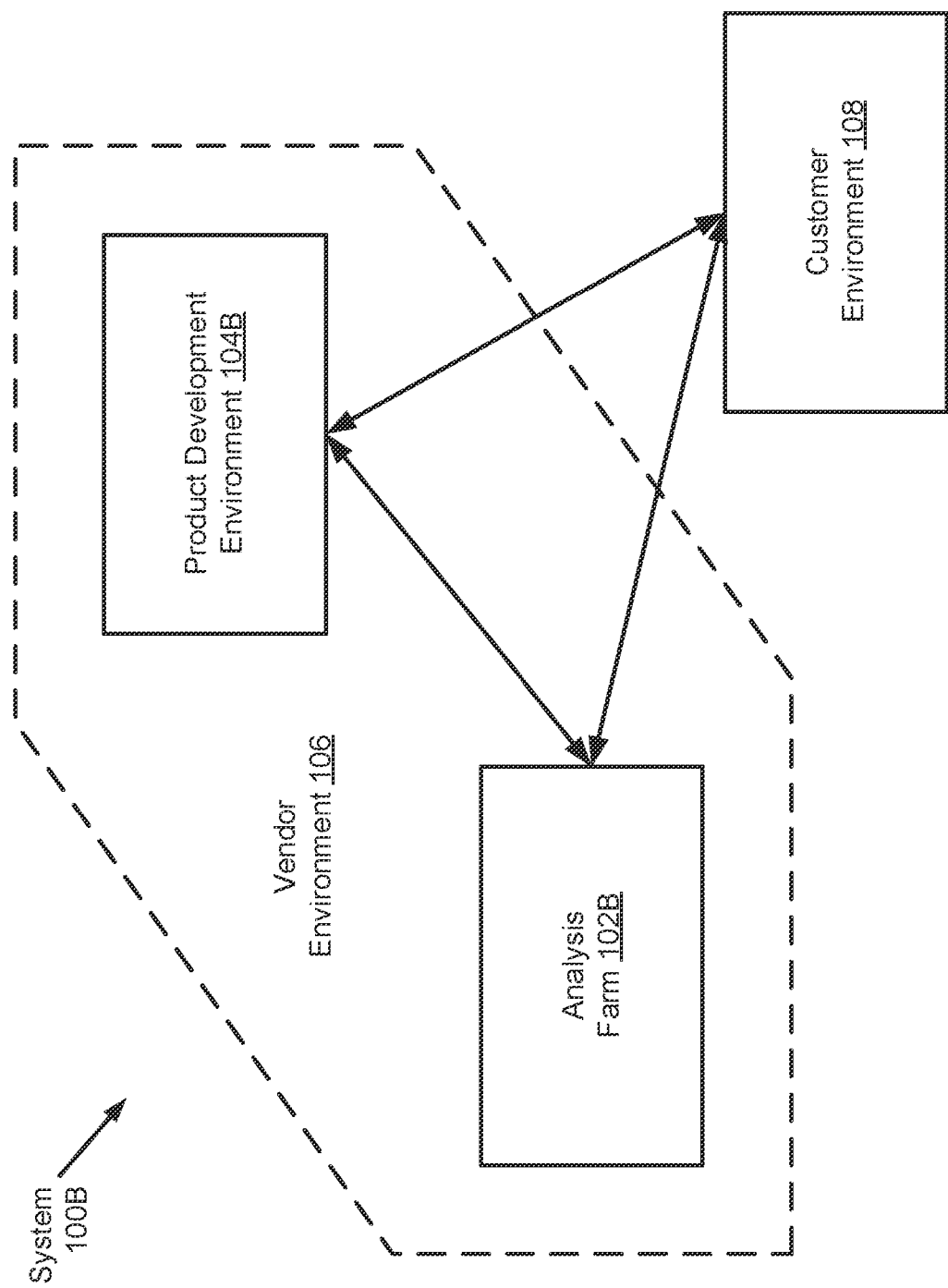
FIG. 1B shows a system in accordance with one or more embodiments of the invention.

FIG. 1B shows a system in accordance with one or more embodiments of the invention. The system (100B) may include a vendor environment (106) operatively connected to a customer environment (108). The vendor environment (106) may include an analysis farm (102B) and a product development environment (104B). Each of these system (100B) components is described below.

In one embodiment of the invention, the vendor environment (106) may represent any privately owned and maintained enterprise information technology (IT) environment belonging to an enterprise IT vendor. An enterprise IT vendor, in turn, may refer to any organization or entity whom may sell, or otherwise provide and maintain, enterprise IT products and/or services. Further, the vendor environment (106) may be implemented through on-premises infrastructure, cloud computing infrastructure, or any hybrid infrastructure thereof.

In one embodiment of the invention, the analysis farm (102B) may represent any information technology (IT) environment designed and configured to conduct upgrade testing (described above) within simulated IT environments. To that extent, the analysis farm (102B) may include functionality to perform the methods outlined in FIGS. 4A-4C, as well as FIG. 5, below. One of ordinary skill will appreciate that the analysis farm (102B) may perform other functionalities without departing from the scope of the invention. Further, the analysis farm (102B) may be implemented using one or more network servers (not shown). Each network server may encompass a physical or a virtual network server, which may reside in an on-premises data center, a cloud computing environment, or a hybrid infrastructure thereof. Additionally, or alternatively, the analysis farm (102B) may be implemented using one or more computing systems similar to the exemplary computing system shown in FIG. 6. The analysis farm (102B), moreover, is described in further detail below with respect to FIG. 2B.

In one embodiment of the invention, the product development environment (104B) may represent any IT environment designed and configured to develop IT-pertinent products—in the form of hardware, software, and/or firmware—including any revisions or versions thereof. To the extent of embodiments of the invention disclosed herein, the product development environment (104B) may include functionality to: submit upgrades (also referred to hereinafter as product versions of products), sought to be tested, to the analysis farm (102B); and receive issue reports, detailing results of the upgrade tests, from the analysis farm (102B). One of ordinary skill will appreciate that the product development environment (104B) may perform other functionalities without departing from the scope of the invention. Further, the product development environment (104B) may be implemented using one or more network servers (not shown). Each network server may encompass a physical or a virtual network server, which may reside in an on-premises data center, a cloud computing environment, or a hybrid infrastructure thereof. Additionally, or alternatively, the product development environment (104B) may be implemented using one or more computing systems similar to the exemplary computing system shown in FIG. 6.

In one embodiment of the invention, the customer environment (108) may represent any privately owned and maintained enterprise IT environment belonging to an enterprise IT customer. An enterprise IT customer, in turn, may refer to any organization or entity whom may purchase, or otherwise obtain and employ, enterprise IT products and/or services. Further, the customer environment (108) may be implemented through on-premises infrastructure, cloud computing infrastructure, or any hybrid infrastructure thereof.

In one embodiment of the invention, the above-mentioned system (100B) components may communicate with one another through a network (not shown) (e.g., a local area network (LAN), a wide area network (WAN) such as the Internet, a mobile network, any other communication network type, or a combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100B) components. Moreover, in communicating with one another, the above-mentioned system (100B) components may employ any combination of wired and/or wireless communication protocols.

While FIG. 1B shows a configuration of components, other system (100B) configurations may be used without departing from the scope of the invention. For example, refer to FIG. 1A.

Figure 2A:
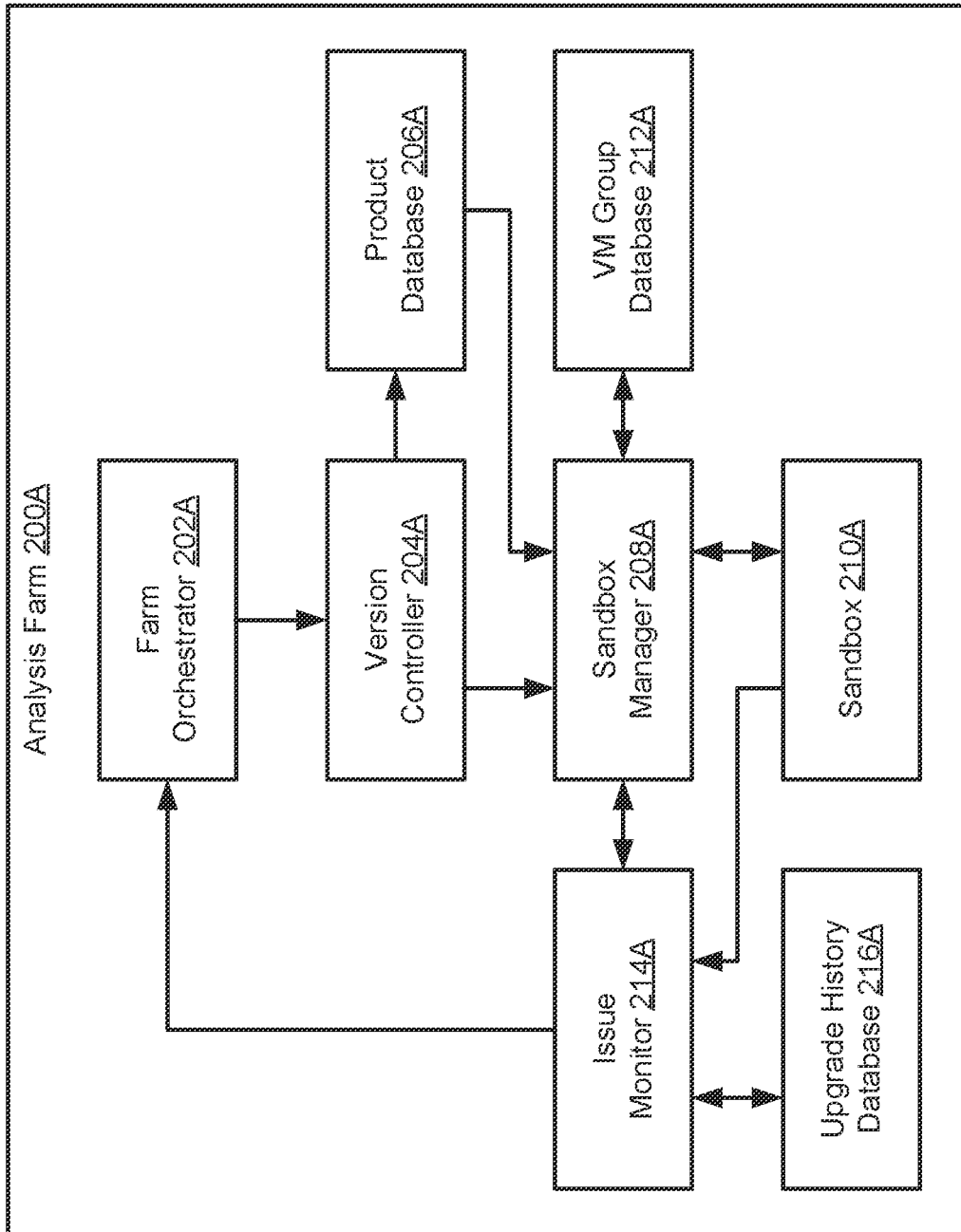
FIG. 2A shows an analysis farm in accordance with one or more embodiments of the invention.

FIG. 2A shows an analysis farm in accordance with one or more embodiments of the invention. The analysis farm (200A) may include a farm orchestrator (202A), a version controller (204A), a product database (206A), a sandbox manager (208A), a sandbox (210A), a virtual machine group database (212A), an issue monitor (214A), and an upgrade history database (216A). Each of these analysis farm (200A) subcomponents is described below.

In one embodiment of the invention, the farm orchestrator (202A) may refer to a computer program that may execute on the underlying hardware of the analysis farm (200A), which may be responsible for triggering version history based upgrade testing across simulated IT environments, as well as handling data exchanges with a product development environment (see e.g., FIG. 1A). To that extent, the farm orchestrator (202A) may include functionality to: receive, for any given product version (described below) of any given enterprise IT product, one or more version installation packages (described below) from the product development environment; provide the received version installation package(s) to the version controller (204A) for storage and/or processing; obtain, for each of one or more virtual machines that may have been executing in the sandbox (210A) and from the issue monitor (214A), (a) one or more upgrade issues (described below) manifested through installation of a version installation package onto the virtual machine, (b) an environmental configuration (described below) replicated by and thus associated with the virtual machine, and (c) a product version installation chain (described below) respective to the virtual machine in view of the given enterprise IT product; generate an issue report using at least the obtained upgrade issue(s), the environment configuration, and the product version installation chain; and provide or submit the issue report to the product development environment. Further, one of ordinary skill will appreciate that the farm orchestrator (202A) may perform other functionalities without departing from the scope of the invention.

In one embodiment of the invention, a product version may refer to a version number assigned to any version of a given enterprise IT product. A version number, for any given version, in turn, may refer to a sequence of numbers that identifies the developmental state of the given version of the given enterprise IT product.

In one embodiment of the invention, a version installation package may refer to a set of computer files, including one or many binary file(s), which collectively facilitate the installation of a given version of a given enterprise IT product onto a given host (e.g., a virtual machine). Each version installation package, should multiple version installation packages be received, may be configured to properly execute within a different operating system that may be hosted on different hosts. Accordingly, when executed by an installer computer program of a given host, a version installation package may enable the installer computer program to: install the given version of the given enterprise IT product onto the given host, where the version installation package is appropriate to and thus compatible with the operating system executing on the given host; and perform other installation relevant functions—e.g., copy any subset or all of the set of computer files onto the given host, register components of the given version of the given enterprise IT product, set security permissions, etc.

In one embodiment of the invention, an upgrade issue may refer to any problem arising or manifesting from the installation of any version of any enterprise IT product onto any host. Said enterprise IT product may either entail a physical (e.g., computing hardware) or a logical (e.g., computing software and/or firmware) component of an enterprise IT environment.

In one embodiment of the invention, an environment configuration may refer to a set of hardware settings for computing hardware emulated by a virtual machine. A virtual machine, in turn, may refer to a computer program that emulates a physical computing system (e.g., an enterprise IT environment) and, thus, provides a self-contained execution environment on which one or more other computer programs (e.g., guest operating systems, applications, and/or services) may execute. Further, the set of hardware settings, which may at least in part define a virtual machine, may include, but is not limited to: a quantity of disk storage space allocated or available to the virtual machine; a quantity of volatile and/or non-volatile memory allocated or available to the virtual machine; access permissions (if any) to networking hardware (e.g., network adapters or cards); a quantity of computer processors (or computer processor cores) allocated or available to the virtual machine; the guest operating system meant to be executing within the virtual machine; and access permissions (if any) to any number of ports, peripherals, input devices, and/or output devices.

In one embodiment of the invention, a product version installation chain may refer to a history or sequence of version numbers (described above) respective to one or more versions of a given enterprise IT product that have been installed (in chronological order) onto a virtual machine.

In one embodiment of the invention, the version controller (204A) may refer to a computer program that may execute on the underlying hardware of the analysis farm (200A), which may be responsible for maintaining, and notifying the sandbox manager (208A) of any new versions of any given enterprise IT product stored on, the product database (206A). To that extent, the version controller (204A) may include functionality to: obtain, for any given version of any given enterprise IT product, one or more version installation packages (described above) from the farm orchestrator (202A); store the obtained version installation package(s), as well as any metadata descriptive thereof, within the product database (206A); and inform the sandbox manager (208A) of a storage location at which the version installation package(s) may be found. Further, one of ordinary skill will appreciate that the version controller (204A) may perform other functionalities without departing from the scope of the invention.

In one embodiment of the invention, the product database (206A) may refer to physical data storage (or logical data storage occupying at least a portion of the physical data storage) on the analysis farm (200A), where one or more version installation packages, as well as any metadata descriptive thereof, for any number of versions of any number of enterprise IT products, may be consolidated. Further, the product database (206A) may, at least in part, be implemented using persistent storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM). The product database (206A) is described in further detail below with respect to FIG. 3A.

In one embodiment of the invention, the sandbox manager (208A) may refer to a computer program that may execute on the underlying hardware of the analysis farm (202A), which may be responsible for configuring and conducting version history based upgrade testing across simulated IT environments. To that extent, for any given version of any given enterprise IT product recently received by the analysis farm (202A), the sandbox manager (208A) may include functionality to: obtain, from the version controller (204A), a storage location of the product database (206A) at which one or more version installation packages, as well as metadata descriptive thereof, for the given version of a given enterprise IT product may be consolidated; ascertain, using at least a portion of the aforementioned metadata, whether the given version is representative of an initial version or a subsequent version (each described below); should the given version represent an initial version—instantiate a virtual machine group within the sandbox (210A); and (S1) register the virtual machine group within the virtual machine group database (212A); alternatively, should the given version instead represent a subsequent version—identify a virtual machine group mapped to the given enterprise IT product; clone the virtual machine group to obtain a cloned virtual machine group; register the cloned virtual machine group within the virtual machine group database (212A); inform the issue monitor (214A) of the cloned virtual machine group in order to update the upgrade history database (216A); and (S2) reanimate the virtual machine group within the sandbox (210A); after either (S1) registering the virtual machine group or (S2) reanimating the virtual machine group—retrieve the version installation package(s) from the obtained storage location of the product database (206A); install, using the version installation package(s), the given version of the given enterprise IT product on any subset or all of the virtual machines of the virtual machine group; notify the issue monitor (214A) to monitor the virtual machine group in order to track the manifestation of any upgrade issues (described above); capture, upon completion of the simulations, a suspended state for each virtual machine of the virtual machine group; and maintain the suspended state(s) within the virtual machine group database (212A). Further, one of ordinary skill will appreciate that the sandbox manager (208A) may perform other functionalities without departing from the scope of the invention.

In one embodiment of the invention, an initial version of any given enterprise IT product may refer to an original or first release, which may reflect an original or first developmental state, of the given enterprise IT product. Meanwhile, a subsequent version of any given enterprise IT product may refer to any successive (e.g., second, third, fourth, etc.) release, which may reflect a successive developmental state, of the given enterprise IT product.

In one embodiment of the invention, the sandbox (210A) may refer to an isolated testing environment wherein version history based upgrade testing across simulated IT environments may be conducted. Concerning product development, the sandbox (210A) may represent a staging area, supported by limited or restricted resources, for the execution and assessment of untested versions of one or more enterprise IT products prior to their deployment in production enterprise IT environments. The sandbox (210A) may be implemented using one or more virtual machines.

In one embodiment of the invention, the virtual machine group database (212A) may refer to physical data storage (or logical data storage occupying at least a portion of the physical data storage) on the analysis farm (200A), where one or more virtual machine groups, as well as any metadata descriptive thereof, mapped to any number of enterprise IT products, may be consolidated. Further, the virtual machine group database (212A) may, at least in part, be implemented using persistent storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM). The virtual machine group database (212A) is described in further detail below with respect to FIG. 3B.

In one embodiment of the invention, the issue monitor (214A) may refer to a computer program that may execute on the underlying hardware of the analysis farm (200A), which may be responsible for upgrade issue (described above) detection and recordation, as well as upgrade history tracking. To that extent, the issue monitor (214A) may include functionality to: observe sandbox (210A) activity for upgrade issues (if any manifest) following the installation of any number of versions of any number of enterprise IT products across sets or groups of virtual machines; maintain the upgrade history database (216A) at least based on any sandbox (210A) activity observations, as well as metadata descriptive of the product version(s) installed and tested; and report the upgrade issue(s) (if any manifest), alongside any associated environment configurations and product version installation chains (described above) thereof, to the farm orchestrator (202A). Further, one of ordinary skill will appreciate that the issue monitor (214A) may perform other functionalities without departing from the scope of the invention.

In one embodiment of the invention, the upgrade history database (216A) may refer to physical data storage (or logical data storage occupying at least a portion of the physical data storage) on the analysis farm (200A), where an upgrade history for one or more virtual machines, as well as any metadata descriptive thereof, and respective to any number of enterprise IT products, may be consolidated. Further, the upgrade history database (216A) may, at least in part, be implemented using persistent storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM). The upgrade history database (216A) is described in further detail below with respect to FIG. 3C.

While FIG. 2A shows a configuration of subcomponents, other analysis farm (200A) configurations may be used without departing from the scope of the invention. For example, refer to FIG. 2B.

Figure 2B:
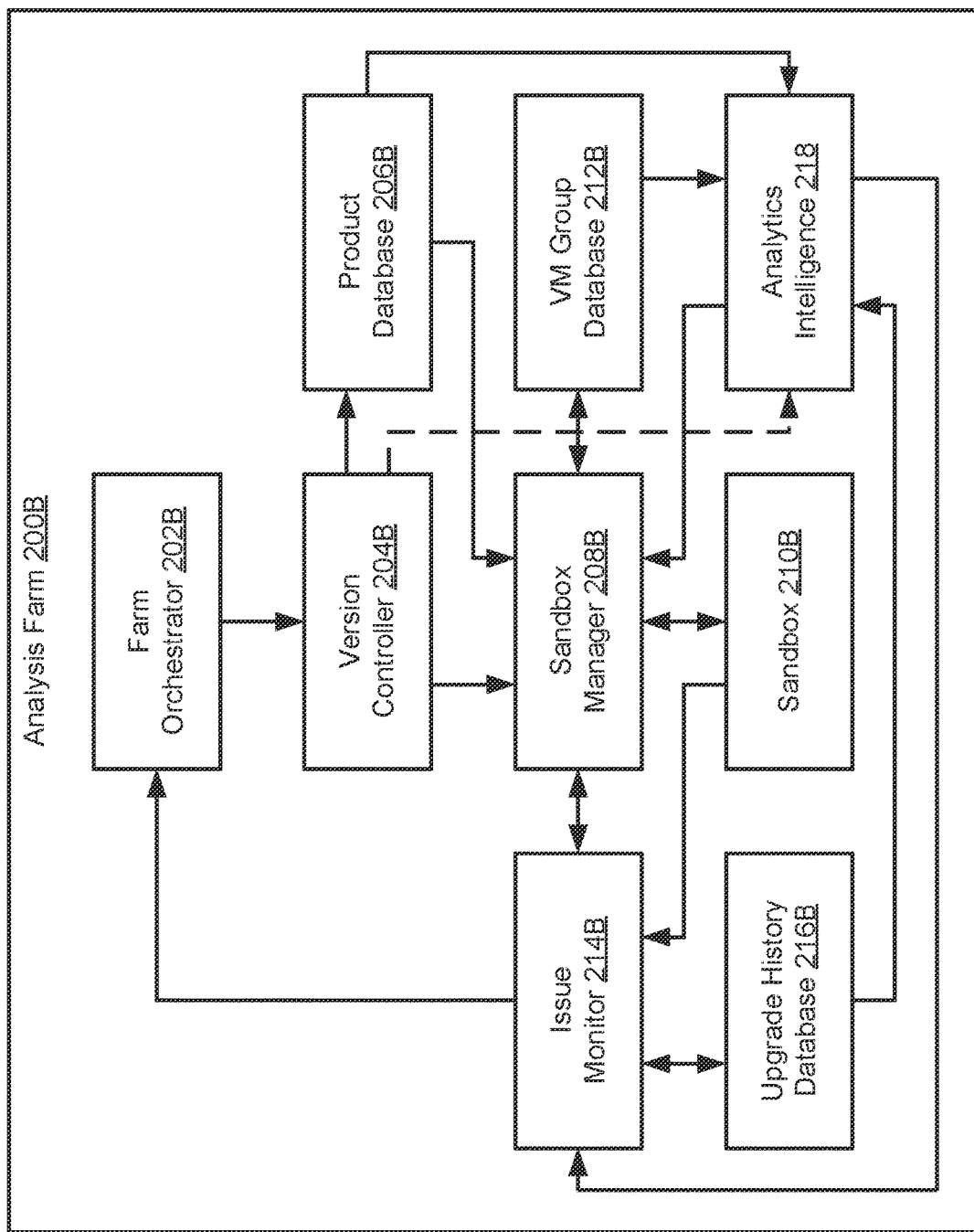
FIG. 2B shows an analysis farm in accordance with one or more embodiments of the invention.

FIG. 2B shows an analysis farm in accordance with one or more embodiments of the invention. The analysis farm (200B) may include a farm orchestrator (202B), a version controller (204B), a product database (206B), a sandbox manager (208B), a sandbox (210B), a virtual machine group database (212B), an issue monitor (214AB), an upgrade history database (216B), and an analytics intelligence (218). Each of these analysis farm (200B) subcomponents is described below.

In one embodiment of the invention, the farm orchestrator (202B) may refer to a computer program that may execute on the underlying hardware of the analysis farm (200B), which may be responsible for triggering version history based upgrade testing across simulated IT environments, as well as handling data exchanges with a product development environment (see e.g., FIG. 1B). To that extent, the farm orchestrator (202B) may include functionality to: receive, for any given product version (described above) (see e.g., FIG. 2A) of any given enterprise IT product, one or more version installation packages (described above) (see e.g., FIG. 2A) from the product development environment; provide the received version installation package(s) to the version controller (204B) for storage and/or processing; obtain, for each of one or more virtual machines that may have been executing in the sandbox (210B) and from the issue monitor (214B), (a) one or more upgrade issues (described above) (see e.g., FIG. 2A) manifested through installation of a version installation package onto the virtual machine, (b) an environmental configuration (described above) (see e.g., FIG. 2A) replicated by and thus associated with the virtual machine, and (c) a product version installation chain (described below) respective to the virtual machine in view of the given enterprise IT product; generate an issue report using at least the obtained upgrade issue(s), the environment configuration, and the product version installation chain; and provide or submit the issue report to the product development environment.

In one embodiment of the invention, the farm orchestrator (202B) may also be responsible for triggering the processing or handling of upgrade pre-test requests (described below). To that extent, the farm orchestrator (202B) may include further functionality to: receive, from and for any given customer environment (see e.g., FIG. 1B), an upgrade pre-test request specifying a product identifier (ID) for any given enterprise IT product installed thereon, and customer environment feature information (e.g., an environmental configuration associated with the given customer environment, and a prospective post-upgrade product version installation chain (i.e., formed from an existing product version installation chain plus a product version relevant to the sought upgrade) associated with the given customer environment and respective to the given enterprise IT product; provide the product ID and customer environment feature information to the version controller (204B) for dissemination and/or processing; obtain, from the issue monitor (214B), an update prediction group to which the given customer environment may belong should the given enterprise IT product installed thereon be upgraded to the sought product version; generate an upgrade pre-test response at least based on the obtained update prediction group; and provide or submit the generated upgrade pre-test response to the given customer environment. Further, one of ordinary skill will appreciate that the farm orchestrator (202B) may perform other functionalities without departing from the scope of the invention.

In one embodiment of the invention, an upgrade pre-test request may refer to a request, submitted by a customer environment (see e.g., FIG. 1B), to conduct an upgrade pre-test assessment. An upgrade pre-test assessment, in turn, may refer to a procedure through which classification-based machine learning (e.g., cluster analysis) may be employed to predict a most probable (or likely) post-upgrade outcome for a prospective product upgrade being considered by the customer environment for a given enterprise IT product installed thereon.

Further, in one embodiment of the invention, the upgrade pre-test assessment may rely on version history based upgrade testing across simulated IT environments (using virtualization) to obtain a collection of virtual machine feature information, including environment configurations, product version installation chains, and recorded upgrade issues (if any), for various virtual machines exposed to a diversity of version history based upgrade testing scenarios in view of the given enterprise IT product. Said virtual machine feature information may subsequently be used to generate a high-dimensional analytic subspace through which the various virtual machines (representative of various simulated enterprise IT environment configurations and their respective exposures to unique version history based upgrade testing scenarios pertaining to the given enterprise IT product) may each be grouped into one of at least two virtual machine clusters (also referred to as upgrade prediction groups)—e.g., at least a passing virtual machine cluster (i.e., a passing group) and a failing virtual machine cluster (i.e., a failing group).

Thereafter, in one embodiment of the invention, customer environment feature information (reflective of the customer environment configuration, their up-to-date upgrade history pertinent to the given enterprise IT product, and the prospective product upgrade being considered) may be superimposed or mapped onto the high-dimensional analytic subspace to identify to which one of the at least two upgrade prediction groups are the circumstances surrounding the customer environment most similar. The assignment of the customer environment to one of the at least two upgrade prediction groups may be synonymous with the predicted post-upgrade outcome.

That is, in one embodiment of the invention, the predicted post-upgrade outcome (i.e., one of the at least two upgrade prediction groups) may refer to a upgrade pre-test assessment result, which may accurately foretell whether pursuing the considered product upgrade, by the customer environment, would lead to success (i.e., an issue-free installation) or failure (i.e., an issue-prone installation). The predicted post-upgrade outcome, accordingly, may serve as a recommendation advising the customer environment to either proceed in the considered product upgrade (e.g., selected upgrade prediction group=passing group) or discontinue the considered product upgrade (e.g., selected upgrade prediction group=failing group).

In one embodiment of the invention, the version controller (204B) may refer to a computer program that may execute on the underlying hardware of the analysis farm (200B), which may be responsible for maintaining, and notifying the sandbox manager (208B) of any new versions of any given enterprise IT product stored on, the product database (206B). To that extent, the version controller (204B) may include functionality to: obtain, for any given version of any given enterprise IT product, one or more version installation packages (described above) from the farm orchestrator (202B); store the obtained version installation package(s), as well as any metadata descriptive thereof, within the product database (206B); and inform the sandbox manager (208B) of a storage location at which the version installation package(s) may be found.

In one embodiment of the invention, the version controller (204B) may also be responsible for disseminating contents of any received upgrade pre-test requests (described above) by the analysis farm (200B). To that extent, for any given upgrade pre-test request, the version controller (204B) may include further functionality to: obtain, received alongside the given upgrade pre-test request, a product ID for a given enterprise IT product installed on a given customer environment and customer environment feature information (described above) from the farm orchestrator (202B); and relay the aforementioned contents of the given upgrade pre-test request to the analytics intelligence (218) for processing. Further, one of ordinary skill will appreciate that the version controller (204B) may perform other functionalities without departing from the scope of the invention.

In one embodiment of the invention, the product database (206B) may refer to physical data storage (or logical data storage occupying at least a portion of the physical data storage) on the analysis farm (200B), where one or more version installation packages, as well as any metadata descriptive thereof, for any number of versions of any number of enterprise IT products, may be consolidated. Further, the product database (206B) may, at least in part, be implemented using persistent storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM). The product database (206B) is described in further detail below with respect to FIG. 3A.

In one embodiment of the invention, the sandbox manager (208B) may refer to a computer program that may execute on the underlying hardware of the analysis farm (202B), which may be responsible for configuring and conducting version history based upgrade testing across simulated IT environments. To that extent, for any given version of any given enterprise IT product recently received by the analysis farm (202B), the sandbox manager (208B) may include functionality to: obtain, from the version controller (204B), a storage location of the product database (206B) at which one or more version installation packages, as well as metadata descriptive thereof, for the given version of a given enterprise IT product may be consolidated; ascertain, using at least a portion of the aforementioned metadata, whether the given version is representative of an initial version or a subsequent version (each described above) (see e.g., FIG. 2A); should the given version represent an initial version—instantiate a virtual machine group within the sandbox (210B); and (S1) register the virtual machine group within the virtual machine group database (212B); alternatively, should the given version instead represent a subsequent version—identify a virtual machine group mapped to the given enterprise IT product; clone the virtual machine group to obtain a cloned virtual machine group; register the cloned virtual machine group within the virtual machine group database (212B); inform the issue monitor (214B) of the cloned virtual machine group in order to update the upgrade history database (216B); and (S2) reanimate the virtual machine group within the sandbox (210B); after either (S1) registering the virtual machine group or (S2) reanimating the virtual machine group—retrieve the version installation package(s) from the obtained storage location of the product database (206B); install, using the version installation package(s), the given version of the given enterprise IT product on any subset or all of the virtual machines of the virtual machine group; notify the issue monitor (214B) to monitor the virtual machine group in order to track the manifestation of any upgrade issues (described above) (see e.g., FIG. 2A); capture, upon completion of the simulations, a suspended state for each virtual machine of the virtual machine group; and maintain the suspended state(s) within the virtual machine group database (212B). Further, one of ordinary skill will appreciate that the sandbox manager (208B) may perform other functionalities without departing from the scope of the invention.

In one embodiment of the invention, the sandbox (210B) may refer to an isolated testing environment wherein version history based upgrade testing across simulated IT environments may be conducted. Concerning product development, the sandbox (210B) may represent a staging area, supported by limited or restricted resources, for the execution and assessment of untested versions of one or more enterprise IT products prior to their deployment in production enterprise IT environments. The sandbox (210B) may be implemented using one or more virtual machines.

In one embodiment of the invention, the virtual machine group database (212B) may refer to physical data storage (or logical data storage occupying at least a portion of the physical data storage) on the analysis farm (200B), where one or more virtual machine groups, as well as any metadata descriptive thereof, mapped to any number of enterprise IT products, may be consolidated. Further, the virtual machine group database (212B) may, at least in part, be implemented using persistent storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM). The virtual machine group database (212B) is described in further detail below with respect to FIG. 3B.

In one embodiment of the invention, the issue monitor (214B) may refer to a computer program that may execute on the underlying hardware of the analysis farm (200B), which may be responsible for upgrade issue (described above) detection and recordation, as well as upgrade history tracking. To that extent, the issue monitor (214B) may include functionality to: observe sandbox (210B) activity for upgrade issues (if any manifest) following the installation of any number of versions of any number of enterprise IT products across sets or groups of virtual machines; maintain the upgrade history database (216B) at least based on any sandbox (210B) activity observations, as well as metadata descriptive of the product version(s) installed and tested; and report the upgrade issue(s) (if any manifest), alongside any associated environment configurations and product version installation chains (described above) thereof, to the farm orchestrator (202B).

In one embodiment of the invention, the issue monitor (214B) may also be responsible for propagating results, pertinent to any received upgrade pre-test requests, to the farm orchestrator (202B). To that extent, the issue monitor (214B) may include further functionality to: obtain, as it pertains to any given upgrade pre-test request, an upgrade prediction group (described above) from the analytics intelligence (218); and provide the upgrade prediction group to the farm orchestrator (202B) for submission to a given customer environment associated with the given upgrade pre-test request. Further, one of ordinary skill will appreciate that the issue monitor (214B) may perform other functionalities without departing from the scope of the invention.

In one embodiment of the invention, the upgrade history database (216B) may refer to physical data storage (or logical data storage occupying at least a portion of the physical data storage) on the analysis farm (200B), where an upgrade history for one or more virtual machines, as well as any metadata descriptive thereof, and respective to any number of enterprise IT products, may be consolidated. Further, the upgrade history database (216B) may, at least in part, be implemented using persistent storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM). The upgrade history database (216B) is described in further detail below with respect to FIG. 3C.

In one embodiment of the invention, the analytics intelligence (218) may refer to a computer program that may execute on the underlying hardware of the analysis farm (200B), which may be responsible for conducting upgrade pre-test assessments (described above). To that extent, for any customer environment seeking a prospective product upgrade for a given enterprise IT product installed thereon, the analytics intelligence (218) may include functionality to: obtain a product ID for the given enterprise IT product and customer environment feature information (described above) from the version controller (204B); identify a virtual machines group mapped to the product ID; aggregate environmental configurations, product version installation chains, and observed upgrade issues (if any), pertinent to each virtual machine of the identified virtual machines group to obtain a collection of virtual machine feature information; process the obtained collection of virtual machine feature information, using classification-based machine learning (e.g., cluster analysis), in order to generate a high-dimensional analytic subspace (or analytics subspace); within the analytic subspace, group each virtual machine of the identified virtual machines group into one of at least two virtual machine clusters (or upgrade prediction groups); superimpose or map the customer environment feature information onto the analytic subspace to select an upgrade prediction group of the at least two upgrade prediction groups with which the customer environment may be associated; and provide the selected upgrade prediction group to the issue monitor (214B) for forwarding to the farm orchestrator (202B). Further, one of ordinary skill will appreciate that the analytics intelligence (218) may perform other functionalities without departing from the scope of the invention.

While FIG. 2B shows a configuration of subcomponents, other analysis farm (200B) configurations may be used without departing from the scope of the invention. For example, refer to FIG. 2A.

Figure 3A:
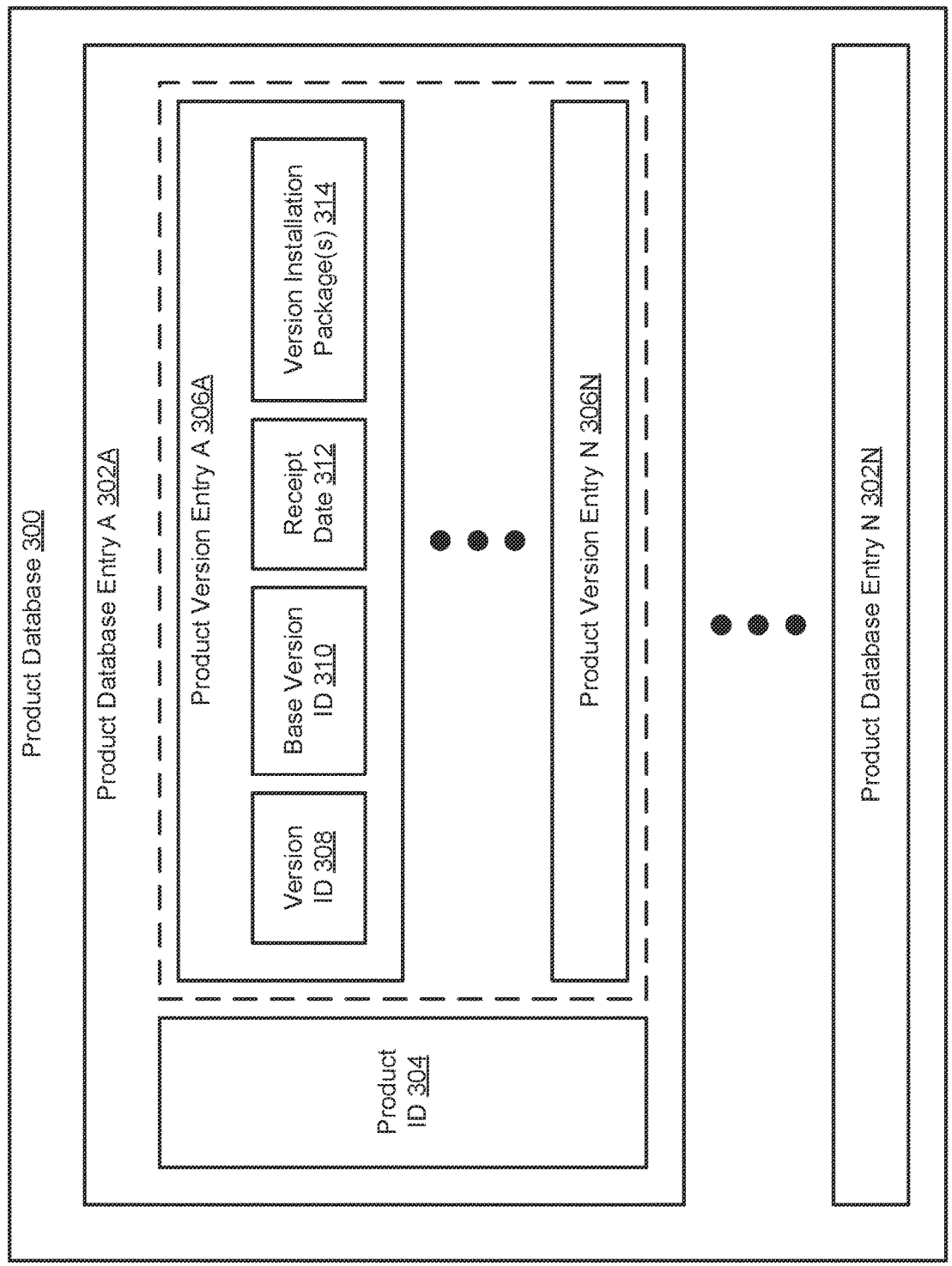
FIG. 3A shows a product database in accordance with one or more embodiments of the invention.

FIG. 3A shows a product database in accordance with one or more embodiments of the invention. The product database (300) may maintain version installation packages (described above) (see e.g., FIG. 2A), as well as any metadata descriptive thereof, for any number of versions of any number of enterprise IT products. Each set of sets of version installation packages for an enterprise IT product, and the metadata associated therewith, may be consolidated within a product database entry (302A-302N). Any given product database entry (302A-302N), respective to a given enterprise IT product, accordingly, may include, but is not limited to, a product identifier (ID) (304) and one or more product version entries (306A-306N). Each of these product database entry (302A-302N) elements is described below.

In one embodiment of the invention, the product ID (304) may refer to a unique character string (e.g., a sequence of characters, where each character may reflect a letter, a number, or a symbol) assigned to and that identifies the given enterprise IT product.

In one embodiment of the invention, any given product version entry (306A-306N) may refer to a data tuple, or an ordered list of items, pertinent to a given version of the given enterprise IT product. Further, for any given version of the given enterprise IT product, the associated product version entry (306A-306N) may include, but is not limited to, a version ID (308), a base version ID (310), a receipt date (312), and a set of version installation packages (314). Each of these product version entry (306A-306N) elements is described below.

In one embodiment of the invention, the version ID (308) (also referred to herein as the product version) may refer to a version number assigned to and that identifies the given version of the given enterprise IT product. A version number, for any given version, in turn, may refer to a sequence of numbers that identifies the developmental state of the given version of the given enterprise IT product.

In one embodiment of the invention, the base version ID (310) may refer to a version number (described above) assigned to and that identifies a parent version (if any) of the given enterprise IT product from which the given version of the given enterprise IT product may be derived. Should the given version constitute an initial version (described above) (see e.g., FIG. 2A), the base version ID (310) may be populated with any numerical value (e.g., "−1"), which may indicate that the given version is not an enhancement of any previously released version (or parent version) of the given enterprise IT product.

In one embodiment of the invention, the receipt date (312) may refer to a timestamp encoding a date and/or time on which the version installation package(s) (314), for the given version of the given enterprise IT product, had been received by the analysis farm.

In one embodiment of the invention, a version installation package (314) may refer to a set of computer files, including one or many binary file(s), which collectively facilitate the installation of the given version of the given enterprise IT product onto a host (e.g., a virtual machine). Each version installation package (314), should multiple version installation packages (314) be specified, may be configured to properly execute within a different operating system that may be hosted on different hosts. Accordingly, when executed by an installer computer program of a given host, a version installation package (314) may enable the installer computer program to: install the given version of the given enterprise IT product onto the given host, where the version installation package (314) is appropriate to and thus compatible with the operating system executing on the given host; and perform other installation relevant functions—e.g., copy any subset or all of the set of computer files onto the given host, register components of the given version of the given enterprise IT product, set security permissions, etc.

While FIG. 3A shows a configuration of subcomponents, other product database (300) configurations may be used without departing from the scope of the invention.

Figure 3B:
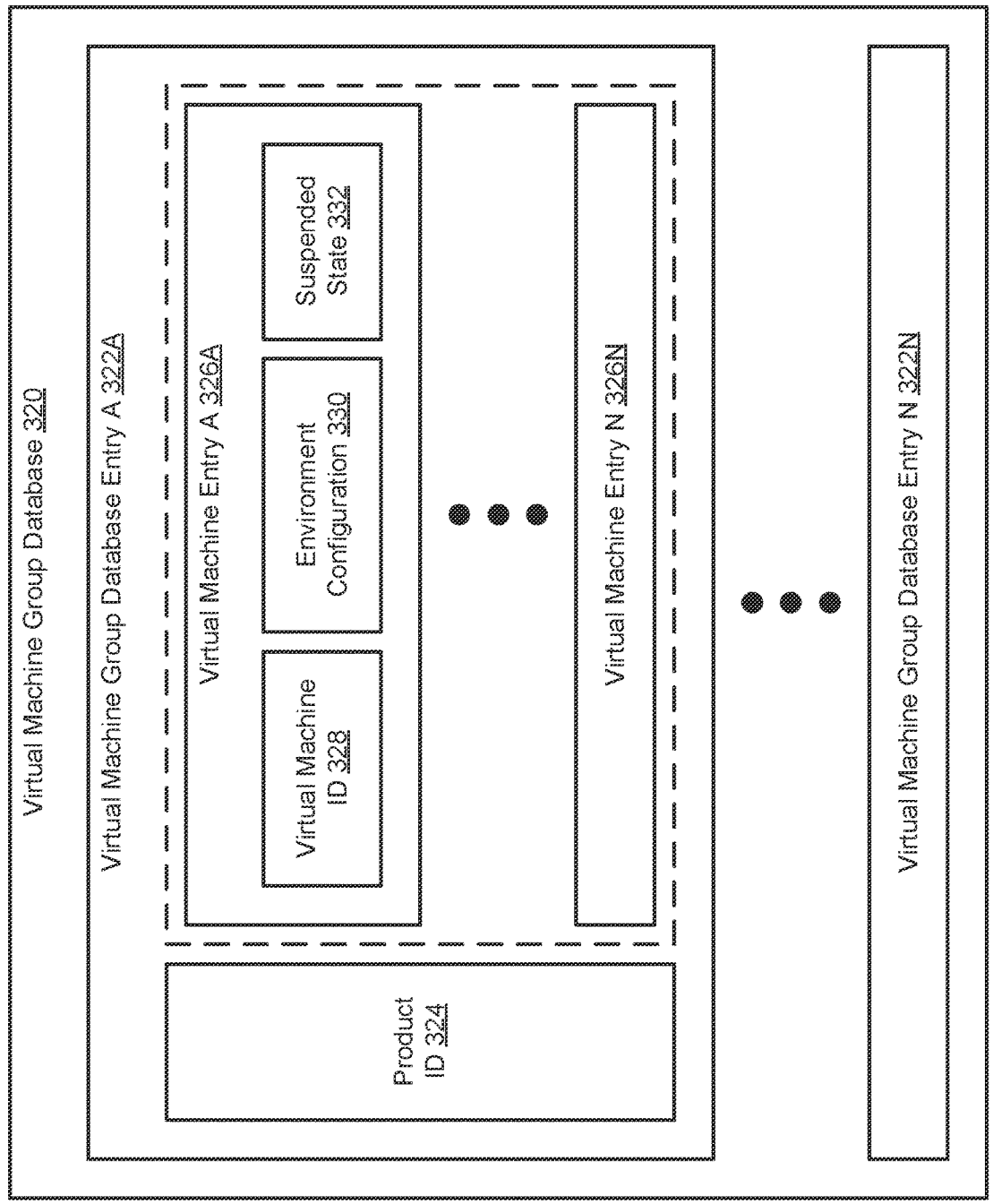
FIG. 3B shows a virtual machine group database in accordance with one or more embodiments of the invention.

FIG. 3B shows a virtual machine group database in accordance with one or more embodiments of the invention. The virtual machine group database (320) may maintain virtual machine groups, as well as any metadata descriptive thereof, mapped to any number of enterprise IT products. A virtual machine group may refer to a set of one or more virtual machines. When mapped to an enterprise IT product, the virtual machine(s) of an associated virtual machine group may undergo version based upgrade testing, reflective of diverse upgrade histories, entailing sequence(s) of versions of the enterprise IT product installed thereon. Each virtual machine group, mapped to an enterprise IT product, and the metadata associated therewith, may be consolidated within a virtual machine group database entry (322A-322N). Any given virtual machine group database entry (322A-322N), respective to a given virtual machine group and a given enterprise IT product, accordingly, may include, but is not limited to, a product identifier (ID) (324) and one or more virtual machine entries (326A-326N). Each of these virtual machine group database entry (322A-322N) elements is described below.

In one embodiment of the invention, the product ID (324) may refer to a unique character string (e.g., a sequence of characters, where each character may reflect a letter, a number, or a symbol) assigned to and that identifies the given enterprise IT product.

In one embodiment of the invention, any given virtual machine entry (326A-326N) may refer to a data tuple, or an ordered list of items, pertinent to a virtual machine of the given virtual machine group. Further, for any given virtual machine, the associated virtual machine entry (326A-326N) may include, but is not limited to, a virtual machine ID (328), an environment configuration (330), and a suspended state (332). Each of these virtual machine entry (326A-326N) elements is described below.

In one embodiment of the invention, the virtual machine ID (328) may refer to a unique character string (e.g., a sequence of characters, where each character may reflect a letter, a number, or a symbol) assigned to and that identifies the given virtual machine.

In one embodiment of the invention, the environment configuration (330) may refer to a set of hardware settings for computing hardware emulated by the given virtual machine. The set of hardware settings, which may at least in part define the given virtual machine, may include, but is not limited to: a quantity of disk storage space allocated or available to the given virtual machine; a quantity of volatile and/or non-volatile memory allocated or available to the given virtual machine; access permissions (if any) to networking hardware (e.g., network adapters or cards); a quantity of computer processors (or computer processor cores) allocated or available to the given virtual machine; the guest operating system meant to be executing within the given virtual machine; and access permissions (if any) to any number of ports, peripherals, input devices, and/or output devices. Further, the environment configuration (330) may, for example, reflect hardware settings resembling those of any existing customer environment (see e.g., FIG. 1B) or of any plausible enterprise IT environment satisfying a support matrix (outlining minimal hardware and software requirements, and other compatibility information) for the given enterprise IT product.

In one embodiment of the invention, the suspended state (332) may refer to a point-in-time state of the given virtual machine at a point-in-time when the given virtual machine may be placed in suspended or sleep mode after completing an instance of version history based update testing. Any instance of version history based update testing may entail: the instantiation or reanimation of a virtual machine group (or any subset thereof) within a sandbox on the analysis farm (see e.g., FIG. 2A or FIG. 2B); the installation of one or more version installation packages (see e.g., FIG. 3A) for any version of any enterprise IT product across the virtual machine group (or any subset thereof); and the recordation of one or more upgrade issues (if any) arising or manifesting, across the virtual machine group (or any subset thereof), following installation of the version installation package(s) thereon.

While FIG. 3B shows a configuration of subcomponents, other virtual machine group database (320) configurations may be used without departing from the scope of the invention.

Figure 3C:
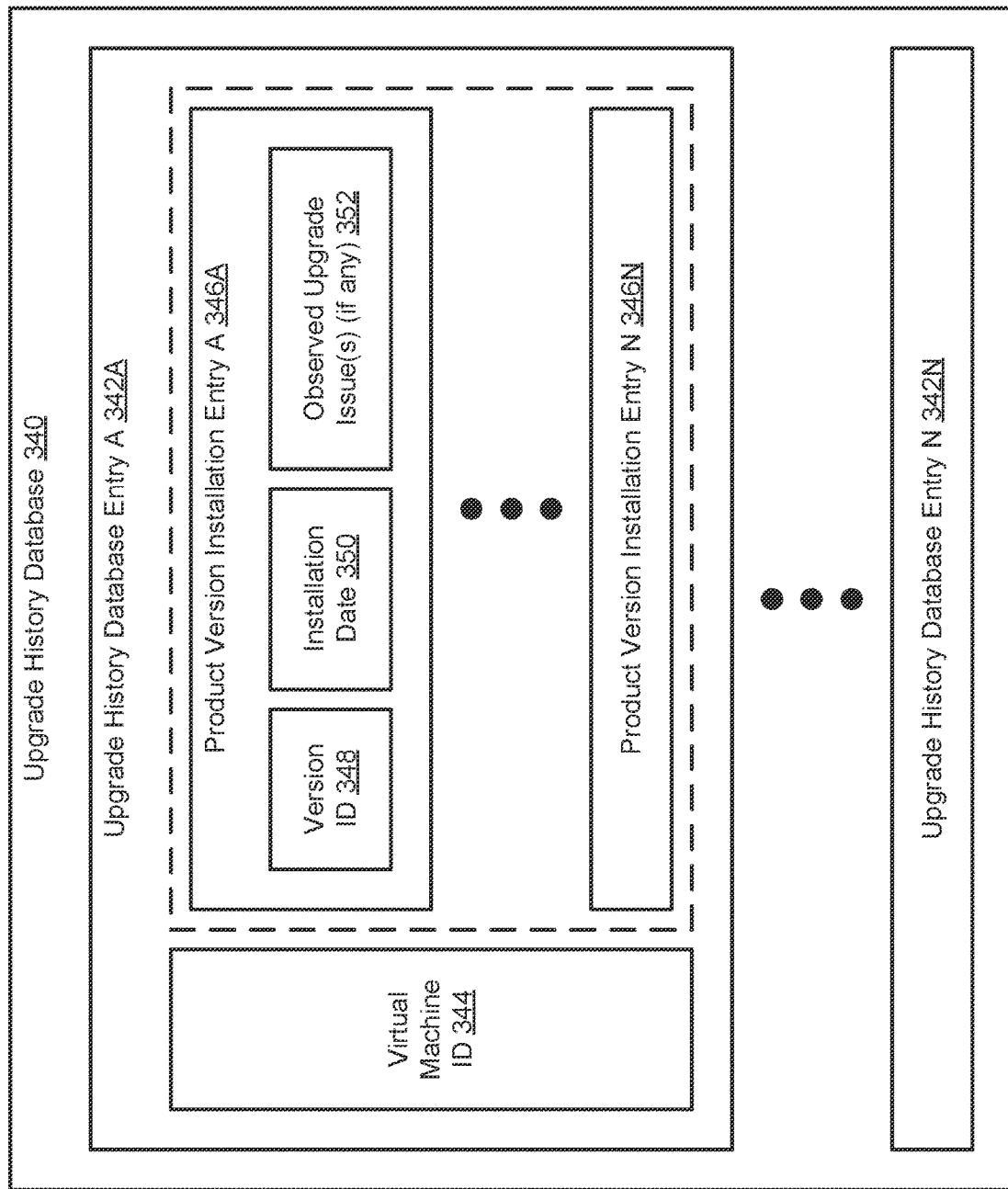
FIG. 3C shows an upgrade history database in accordance with one or more embodiments of the invention.

FIG. 3C shows an upgrade history database in accordance with one or more embodiments of the invention. The upgrade history database (340) may maintain upgrade histories for any number of virtual machines, as well as any metadata descriptive thereof, which may entail any number of enterprise IT products. An upgrade history may refer to information detailing a sequence of product upgrades, pertinent to an enterprise IT product, installed on a virtual machine. Each upgrade history, respective to a virtual machine, and the metadata associated therewith, may be consolidated within an upgrade history database entry (342A-342N). Any given upgrade history database entry (342A-342N), for a given virtual machine whereon a given sequence of version(s) of a given enterprise IT product had been installed thereon, accordingly, may include, but is not limited to, a virtual machine identifier (ID) (344) and one or more product version installation entries (346A-346N). Each of these upgrade history database entry (342A-342N) elements is described below.

In one embodiment of the invention, the virtual machine ID (344) may refer to a unique character string (e.g., a sequence of characters, where each character may reflect a letter, a number, or a symbol) assigned to and that identifies the given virtual machine.

In one embodiment of the invention, any given product version installation entry (346A-346N) may refer to a data tuple, or an ordered list of items, pertinent to an installation of a given version of the given enterprise IT product onto the given virtual machine. Further, for any given version installation, the associated product version installation entry (346A-346N) may include, but is not limited to, a version ID (348), an installation date (350), and a set of observed upgrade issues (352) (if any). Each of these product version installation entry (346A-346N) elements is described below.

In one embodiment of the invention, the version ID (348) (also referred to herein as the product version) may refer to a version number assigned to and that identifies the given version of the given enterprise IT product. A version number, for any given version, in turn, may refer to a sequence of numbers that identifies the developmental state of the given version of the given enterprise IT product.

In one embodiment of the invention, the installation date (350) may refer to a timestamp encoding a date and/or time on which the given version of the given enterprise IT product had been installed on the given virtual machine.

In one embodiment of the invention, an observed upgrade issue (352) (if any) may refer to any observed problem arising or manifesting from the installation of the given version of the given enterprise IT product onto the given virtual machine. Examples of an observed upgrade issue (352) may include, but are not limited to, a lack of permissions to access one or more directories; a lack of storage space to accommodate a logical upgrade installation; any thermal rises across hardware components; installation package errors that may hinder the installation, in part or in in whole, of a logical upgrade; and any upgrade incompatibilities with an operating system and/or hardware configuration. Further, an observed upgrade issue (352) (if any) may be recorded using an upgrade issue ID and/or an upgrade issue description. An upgrade issue ID may refer to a unique character string (e.g., a sequence of characters, where each character may reflect a letter, a number, or a symbol) assigned to and that identifies an observed upgrade issue. Meanwhile, an upgrade issue description may refer to a concise statement (e.g., one to three sentences) that details the nature or context surrounding an observed upgrade issue.

While FIG. 3C shows a configuration of subcomponents, other upgrade history database (340) configurations may be used without departing from the scope of the invention.

Figure 4A:
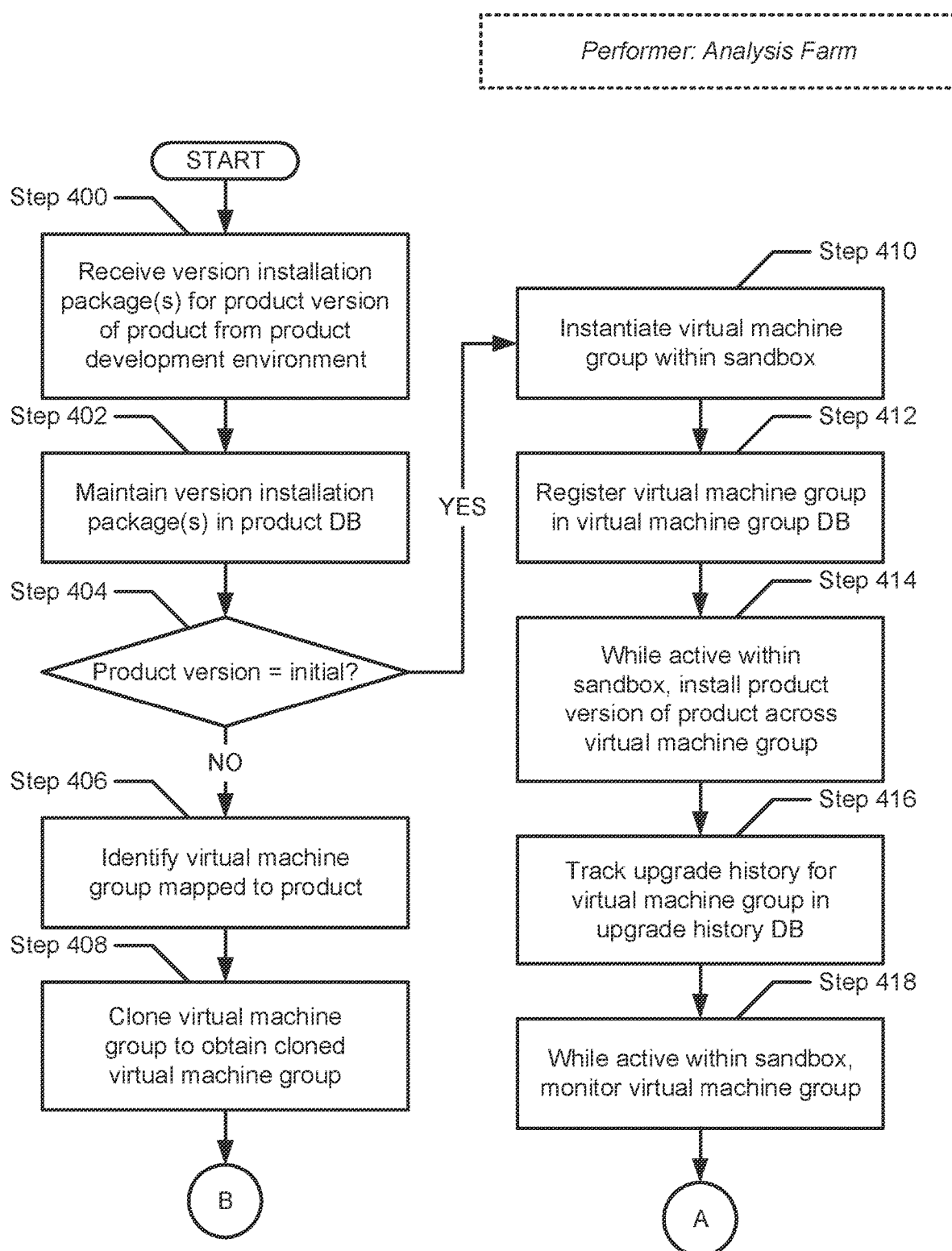
FIGS. 4A-4C show flowcharts describing a method for version history based upgrade testing across simulated information technology environments in accordance with one or more embodiments of the invention.
Figure 4B:
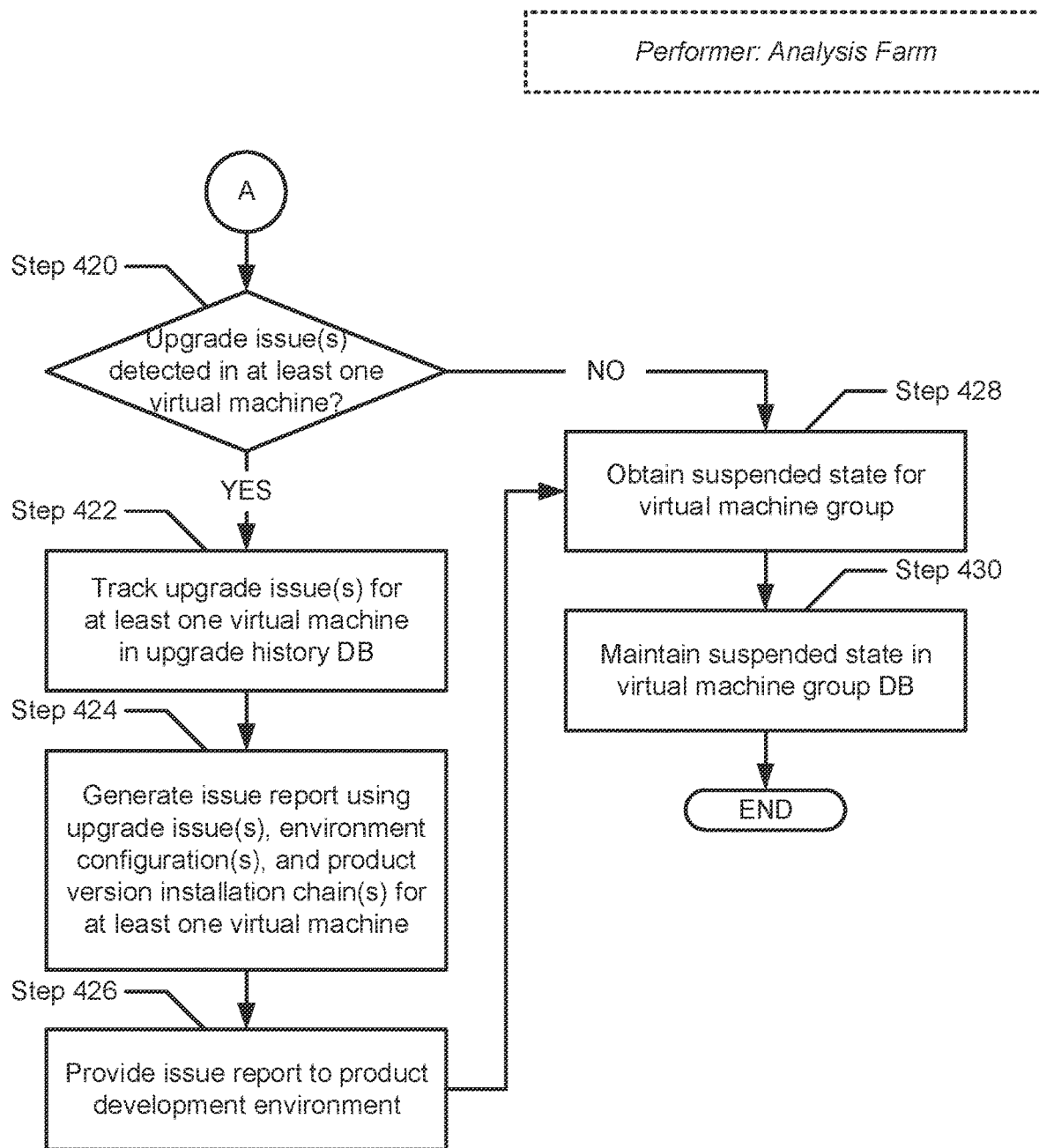
Figure 4C:
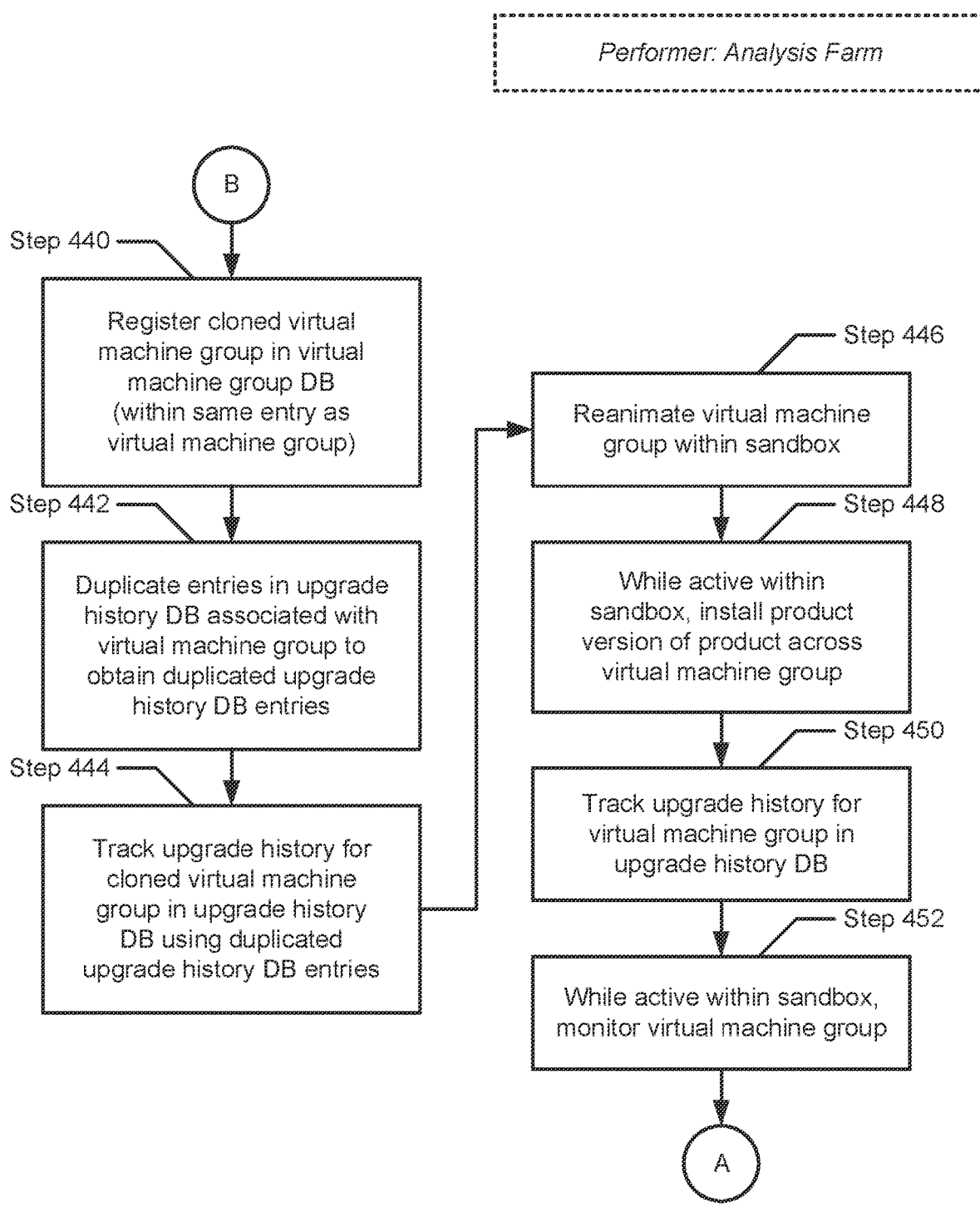

FIGS. 4A-4C show flowcharts describing a method for version history based upgrade testing across simulated information technology environments in accordance with one or more embodiments of the invention. The various steps outlined below may be performed by the analysis farm (see e.g., FIG. 2A or FIG. 2B). Further, while the various steps in the flowchart are presented and described sequentially, one of ordinary skill will appreciate that some or all steps may be executed in different orders, may be combined or omitted, and some or all steps may be executed in parallel.

Turning to FIG. 4A, in Step 400, one or more version installation packages is/are received from a product development environment (see e.g., FIG. 1A or FIG. 1B). In one embodiment of the invention, the version installation package(s) may each be compatible with a different operating system and may all be associated with a given product version of a given enterprise information technology (IT) product.

In Step 402, the version installation package(s) (received in Step 400) is/are maintained in a product database (see e.g., FIG. 3A) on the analysis farm (see e.g., FIG. 2A or FIG. 2B). In one embodiment of the invention, maintaining the version installation package(s) in the product database may entail: examining metadata, received alongside and descriptive of the version installation package(s), to obtain a product identifier (ID) associated with the given enterprise IT product, a version ID associated with the given product version, and, if applicable, a base version ID associated with a parent version from which the given product version may be derived; performing a lookup on the product database using the obtained product ID; based on the lookup, either identifying an existing product database entry, or creating a new product database entry, for the given enterprise IT product; should an existing product database entry be found—creating a new product version entry therein, including the version ID, the base version ID (if any), a receipt date encoding a date and/or time the version installation package (s) has/had been received, and the version installation package(s); alternatively, should a new product version entry be created—storing the product ID and a new product version entry therein, where the new product version entry includes the version ID, the base version ID (if any), a receipt date (described above), and the version installation package(s).

In Step 404, a determination is made as to whether the given product version, associated with the version installation package(s) (received in Step 400), is representative of an initial version or a subsequent version. An initial version of any enterprise IT product may refer to an original or first release, which may reflect an original or first developmental state, of the enterprise IT product. Meanwhile, a subsequent version of any enterprise IT product may refer to any successive (e.g., second, third, fourth, etc.) release, which may reflect a successive developmental state, of the enterprise IT product. Further, the determination may be contingent on whether a base version ID (described above) had been obtained (in Step 402) through examination of metadata descriptive of the version installation package(s). Accordingly, in one embodiment of the invention, if it is determined that the given product version is representative of a subsequent version (i.e., a base version ID had been obtained), then the method proceeds to Step 406. On the other hand, in another embodiment of the invention, if it is alternatively determined that the given product version is representative of an initial version (i.e., a base version ID had not been obtained), then the method alternatively proceeds to Step 410.

In Step 406, following the determination (made in Step 404) that the given product version represents a subsequent version (described above), an existing virtual machine group is identified. In one embodiment of the invention, the existing virtual machine group may map to the given enterprise IT product. Further, identification of the existing virtual machine group may entail: performing a lookup on a virtual machine group database (see e.g., FIG. 3B) using the product ID (obtained in Step 402); and based on the lookup, identifying an existing virtual machine group database entry, including the product ID and a set of existing virtual machine entries—each maintaining a suspended state and metadata (i.e., virtual machine ID and environment configuration) associated with a virtual machine of a set of virtual machines forming the existing virtual machine group.

In Step 408, the existing virtual machine group (identified in Step 406) is cloned to obtain a cloned (existing) virtual machine group. Specifically, in one embodiment of the invention, the suspended state and environment configuration pertinent to each virtual machine of the existing virtual machine group may be duplicated and mapped to a corresponding virtual machine of the cloned (existing) virtual machine group. Each virtual machine, of the cloned (existing) virtual machine group, however, may be assigned a unique virtual machine ID distinct from any of the corresponding virtual machine(s) of the existing virtual machine group. From here, the method proceeds to Step 440 (described below) (see e.g., FIG. 4C).

In one embodiment of the invention, the cloned (existing) virtual machine group may serve as a control group where the virtual machine(s) thereof, having an identical environment configuration and upgrade history to the virtual machine(s) of the existing virtual machine group, may not be subjected to installation of the given product version.

In Step 410, following the alternative determination (made in Step 404) that the given product version instead represents an initial version (described above), a new virtual machine group is instantiated. In one embodiment of the invention, instantiation of the new virtual machine group may entail: first, selecting an appropriate number of virtual machines that may form the new virtual machine group, where the appropriate number of virtual machines may be derived from a registry of customer environments, and/or from a number of plausible enterprise IT environments satisfying a support matrix (outlining minimal hardware and software requirements, and other compatibility information) for the given enterprise IT product; next, for each virtual machine that may form the new virtual machine group—generating a virtual machine ID assigned to and that identifies the virtual machine, and generating an environment configuration resembling that of an existing customer environment or of a plausible enterprise IT environment that satisfies the support matrix for the given enterprise IT product; and finally, activating or running each virtual machine that may form the new virtual machine group within a sandbox on the analysis farm (see e.g., FIG. 2A or FIG. 2B).

In Step 412, the new virtual machine group (instantiated in Step 410) (or more specifically, each virtual machine thereof) is registered within the virtual machine group database. In one embodiment of the invention, the registration of any given virtual machine of the new virtual machine group, in the virtual machine group database (see e.g., FIG. 3B), may entail: creating, within the virtual machine group database, a new virtual machine group database entry; storing, within the new virtual machine group database entry, the product ID (obtained in Step 402) associated with the given enterprise IT product a new virtual machine entry for each virtual machine of the new virtual machine group; and storing, at any given new virtual machine entry, respectively, for any given virtual machine of the new virtual machine group—the virtual machine ID (generated in Step 410) for the given virtual machine and the environment configuration (also generated in Step 410) for the given virtual machine.

In Step 414, while the new virtual machine group (instantiated in Step 410) is active or running within the sandbox, the given product version is installed there-across. That is, in one embodiment of the invention, for each virtual machine of the new virtual machine group: first, an environment configuration for the virtual machine may be examined to identify an operating system executing therein; next, a version installation package, of the version installation package(s) (received in Step 400), may be selected, where the selected version installation package may be compatible with the identified operating system; and finally, the selected version installation package may be used to install the given product version on the virtual machine.

In Step 416, an upgrade history, for each virtual machine of the new virtual machine group (instantiated in Step 410), is tracked in an upgrade history database (see e.g., FIG. 3C) on the analysis farm. In one embodiment of the invention, tracking the upgrade history of any given virtual machine of the new virtual machine group, in the upgrade history database, may entail: creating a new upgrade history database entry for the given virtual machine therein; storing, within the new upgrade history database entry, a virtual machine ID associated with the given virtual machine and a new product version installation entry; and storing, within the new product version installation entry, a version ID associated with the given product version and an installation date encoding a date and/or time on which the given product version had been installed on the given virtual machine.

In Step 418, while the new virtual machine group (instantiated in Step 410) is active or running within the sandbox, and post-installation of the given product version there-across, the new virtual machine group is monitored. In one embodiment of the invention, the new virtual machine group may be monitored for upgrade issues. An upgrade issue may refer to any problem arising or manifesting from the installation of any version (e.g., the given product version) of any enterprise IT product (e.g., the given enterprise IT product) onto any host (e.g., each virtual machine of the new virtual machine group). Examples of an upgrade issue may include, but are not limited to, a lack of permissions to access one or more directories; a lack of storage space to accommodate a logical upgrade installation; any thermal rises across hardware components; installation package errors that may hinder the installation, in part or in in whole, of a logical upgrade; and any upgrade incompatibilities with an operating system and/or hardware configuration. From here, the method proceeds to Step 420 (described below) (see e.g., FIG. 4B).

Turning to FIG. 4B, in Step 420, following a monitoring of the new virtual machine group (in Step 418), or following a monitoring of an existing virtual machine group (in Step 452) (described below), a determination is made as to whether any upgrade issues had been detected or observed in any virtual machine(s) of the new (or existing) virtual machine group. Accordingly, in one embodiment of the invention, if it is determined that at least one upgrade issue had been observed on at least one virtual machine, then the method proceeds to Step 422. On the other hand, in another embodiment of the invention, if it is alternatively determined that zero upgrade issues had been observed across the virtual machine(s) of the new (or existing) virtual machine group, then the method alternatively proceeds to Step 428.

In Step 422, following the determination (made in Step 420) that at least one upgrade issue had been observed on at least one virtual machine of the new (or existing) virtual machine group (monitored in Step 418 or Step 452), the observed upgrade issue(s) is/are tracked within the upgrade history database. In one embodiment of the invention, tracking the upgrade issue(s) observed on any given virtual machine of the new (or existing) virtual machine group, in the upgrade history database, may entail: obtaining a virtual machine ID associated with the given virtual machine; performing a lookup on the upgrade history database using the obtained virtual machine ID; based on the lookup, identifying an existing upgrade history database entry for the given virtual machine, including the virtual machine ID and one or more existing product version installation entries; performing another lookup across the existing product version installation entry (entries) using the given product version; based on the other lookup, identifying an existing product version installation entry, including a version ID matching the given product version; and modifying or updating the identified existing product version installation entry to further include the upgrade issue(s) observed on the given virtual machine.

In Step 424, an issue report is generated. In one embodiment of the invention, the issue report may include, for each virtual machine, on which at least one upgrade issue had been observed, and of the new (or existing) virtual machine group (monitored in Step 418 or Step 452): the observed upgrade issue(s) manifested on the virtual machine following installation of the given product version thereon; an environment configuration associated with the virtual machine; and a product version installation chain associated with the virtual machine. Further, for any given virtual machine, the product version installation chain may refer to a history or sequence of version numbers, respective to one or more versions (including the given product version) of the given enterprise IT product, that have been installed (in chronological order) onto the given virtual machine.

In Step 426, the issue report (generated in Step 424) is subsequently provided or submitted to the product development environment. From here, the method proceeds to Step 428.

In Step 428, following submission of an issue report (in Step 426), or following the alternative determination (made in Step 420) that zero upgrade issues had been observed across the virtual machine(s) of the new virtual machine group (monitored in Step 418) or of the existing virtual machine group (monitored in Step 452), for each virtual machine of the new (or existing) virtual machine group, the virtual machine is suspended and a suspended state thereof is obtained. In one embodiment of the invention, the suspended state for any given virtual machine may refer to a point-in-time state of the given virtual machine at a point-in-time when the given virtual machine may be placed in suspended or sleep mode after completing an instance of version history based update testing (described above) (see e.g., FIG. 3B).

In Step 430, the suspended state (obtained in Step 428), for each virtual machine of the new (or existing) virtual machine group, is maintained in the virtual machine group database. In one embodiment of the invention, maintaining the suspended state for any given virtual machine of the new (or existing) virtual machine group, in the virtual machine group database (see e.g., FIG. 3B), may entail: performing a lookup on the virtual machine group database using the product ID (obtained in Step 402) associated with the given enterprise IT product; based on the lookup, identifying an existing virtual machine group database entry, including the product ID and one or more existing virtual machine entries; performing another lookup across the existing virtual machine entry (entries) using the virtual machine ID associated with the given virtual machine; based on the other lookup, identifying an existing virtual machine entry, including the virtual machine ID; and modifying or updating the identified existing virtual machine entry to include the suspended state (should no previous suspended state be specified therein) or to replace a previous suspended state with the suspended state (should a previous suspended state be specified therein).

Turning to FIG. 4C, in Step 440, following the cloning (in Step 408) of the existing virtual machine group (identified in Step 406) to obtain a cloned (existing) virtual machine group, each virtual machine of the cloned (existing) virtual machine group is registered. In one embodiment of the invention, the registration of any given virtual machine of the cloned (existing) virtual machine group, in the virtual machine group database (see e.g., FIG. 3B), may entail: performing a lookup on the virtual machine group database using the product ID (obtained in Step 402) associated with the given enterprise IT product; based on the lookup, identifying an existing virtual machine group database entry, including the product ID and a set of existing virtual machine entries; appending a new virtual machine entry to the existing virtual machine entry (entries); and storing, within the new virtual machine entry, a virtual machine ID associated with the given virtual machine, and the environment configuration (cloned in Step 408) that had been associated with a corresponding virtual machine of the existing virtual machine group (identified in Step 406). Further, when registration completes, virtual machine(s) of the existing virtual machine group may merge with virtual machine(s) of the cloned (existing) virtual machine group to produce an updated (existing) virtual machine group including a union set of the virtual machines from both the existing and cloned (existing) virtual machine groups.

In Step 442, a set of existing upgrade history database entries, in the upgrade history database, is/are duplicated. In one embodiment of the invention, each existing upgrade history database entry, targeted for duplication, may pertain to a different virtual machine of the existing virtual machine group (identified in Step 406). Further, in duplicating the set of existing upgrade history database entries, a set of duplicated (existing) upgrade history database entries may be obtained. Like their existing upgrade history database entry counterpart, each duplicated (existing) upgrade history database entry may include a virtual machine ID associated with a virtual machine of the existing virtual machine group, and one or more product version installation entries. Moreover, any given product version installation entry, pertinent to any given version of any given enterprise IT product, may include a version ID associated with the given version, an installation date encoding a date and/or time on which the given version had been installed on the virtual machine, and a set of observed upgrade issues (if any had been observed following installation of the given version on the virtual machine).

In Step 444, using the duplicated (existing) upgrade history database entries (obtained in Step 442), an upgrade history, for each virtual machine of the cloned (existing) virtual machine group (obtained in Step 408), is tracked in the upgrade history database. In one embodiment of the invention, tracking the upgrade history of any given virtual machine of the cloned (existing) virtual machine group, in the upgrade history database, may entail: identifying a duplicated (existing) upgrade history database entry pertaining to a virtual machine of the existing virtual machine group, where the virtual machine represents a counterpart to the given virtual machine; within the identified, duplicated (existing) upgrade history database entry, replacing an existing virtual machine ID (associated with the virtual machine of the existing virtual machine group) with a virtual machine ID associated with the given virtual machine; and updating the upgrade history database to further include the identified, duplicated (existing) upgrade history database entry (that includes the replaced virtual machine ID).

In Step 446, the existing virtual machine group (identified in Step 406) is reanimated. In one embodiment of the invention, reanimation of any given virtual machine, of the existing virtual machine group, may entail: performing a lookup on the virtual machine group database using a product ID (obtained in Step 402) associated with the given enterprise IT product; based on the lookup, identifying an existing virtual machine group database entry, including the product ID and one or more existing virtual machine entries; performing another lookup across the existing virtual machine entry (entries) using a virtual machine ID associated with the given virtual machine; based on the other lookup, identifying an existing virtual machine entry, including the virtual machine ID, an environment configuration, and a suspended state—all pertinent to the given virtual machine; retrieving the suspended state from the identified existing virtual machine entry; and, while within the sandbox on the analysis farm, resuming an execution or running of the given virtual machine using the suspended state.

In Step 448, while the existing virtual machine group (reanimated in Step 446) is active or running within the sandbox, the given product version is installed there-across. That is, in one embodiment of the invention, for each virtual machine of the existing virtual machine group: first, an environment configuration for the virtual machine may be examined to identify an operating system executing therein; next, a version installation package, of the version installation package(s) (received in Step 400), may be selected, where the selected version installation package may be compatible with the identified operating system; and finally, the selected version installation package may be used to install the given product version on the virtual machine.

In Step 450, an upgrade history, for each virtual machine of the existing virtual machine group (reanimated in Step 446), is tracked in the upgrade history database (see e.g., FIG. 3C) on the analysis farm. In one embodiment of the invention, tracking the upgrade history of any given virtual machine of the existing virtual machine group, in the upgrade history database, may entail: obtaining a virtual machine ID associated with the given virtual machine; performing a lookup on the upgrade history database using the obtained virtual machine ID; based on the lookup, identifying an existing upgrade history database entry, including the virtual machine ID and one or more existing product version installation entries; appending a new product version installation entry to the existing product version installation entry (entries); and storing, within the new product version installation entry, a version ID associated with the given product version and an installation date encoding a date and/or time on which the given product version had been installed on the given virtual machine.

In Step 452, while the existing virtual machine group (reanimated in Step 446) is active or running within the sandbox, and post-installation of the given product version there-across, the existing virtual machine group is monitored. In one embodiment of the invention, the existing virtual machine group may be monitored for upgrade issues. An upgrade issue may refer to any problem arising or manifesting from the installation of any version (e.g., the given product version) of any enterprise IT product (e.g., the given enterprise IT product) onto any host (e.g., each virtual machine of the existing virtual machine group). Examples of an upgrade issue may include, but are not limited to, a lack of permissions to access one or more directories; a lack of storage space to accommodate a logical upgrade installation; any thermal rises across hardware components; installation package errors that may hinder the installation, in part or in in whole, of a logical upgrade; and any upgrade incompatibilities with an operating system and/or hardware configuration. From here, the method proceeds to Step 420 (described above) (see e.g., FIG. 4B).

Figure 5:
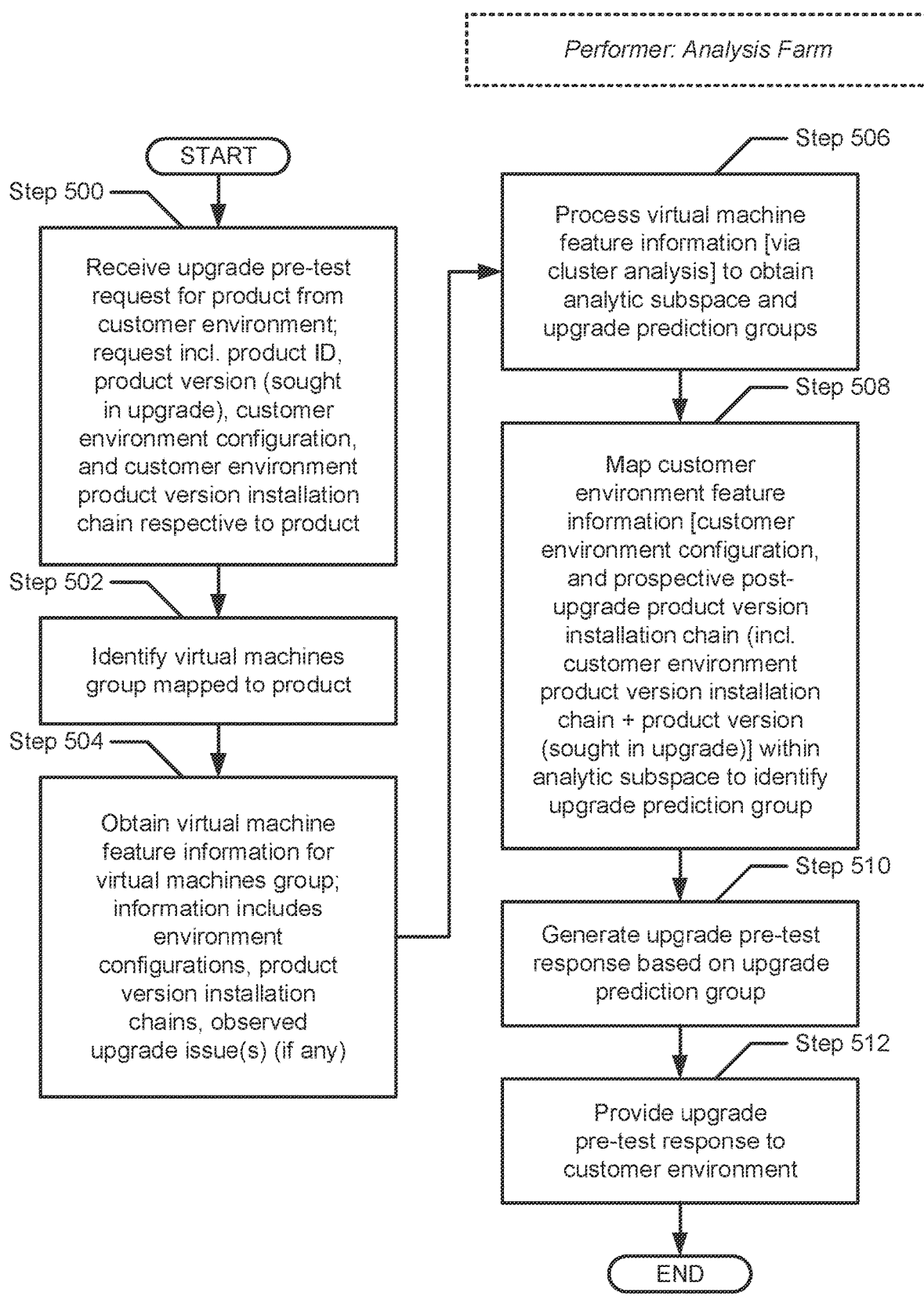
FIG. 5 shows a flowchart describing a method for processing upgrade pre-test requests in accordance with one or more embodiments of the invention.

FIG. 5 shows a flowchart describing a method for processing upgrade pre-test requests in accordance with one or more embodiments of the invention. The various steps outlined below may be performed by the analysis farm (see e.g., FIG. 2B). Further, while the various steps in the flowchart are presented and described sequentially, one of ordinary skill will appreciate that some or all steps may be executed in different orders, may be combined or omitted, and some or all steps may be executed in parallel.

Turning to FIG. 5, in Step 500, an upgrade pre-test request is received from a customer environment (see e.g., FIG. 1B). In one embodiment of the invention, the upgrade pre-test request may refer to a request to conduct an upgrade pre-test assessment. An upgrade pre-test assessment, in turn, may refer to a procedure through which classification-based machine learning (e.g., cluster analysis) may be employed to predict a most probable (or likely) post-upgrade outcome for a prospective product upgrade being considered by the customer environment for a given enterprise IT product installed thereon. Further, the upgrade pre-test request may include: a product identifier (ID) associated with the given enterprise IT product; a product version (or a version number associated with the prospective product upgrade being considered); a customer environment configuration entailing a set of hardware settings for computing hardware implementing the customer environment; and a customer environment product version installation chain reflecting an up-to-date history or sequence of version numbers (described above), respective to one or more versions of the given enterprise IT product, that have been installed (in chronological order) onto the customer environment thus far.

In Step 502, an existing virtual machine group is identified. In one embodiment of the invention, the existing virtual machine group may map to the given enterprise IT product. Further, identification of the existing virtual machine group may entail: performing a lookup on a virtual machine group database (see e.g., FIG. 3B) using the product ID (received in Step 500); and based on the lookup, identifying an existing virtual machine group database entry, including the product ID and a set of existing virtual machine entries— each maintaining a suspended state and metadata (i.e., virtual machine ID and environment configuration) associated with a virtual machine of a set of virtual machines forming the existing virtual machine group.

In Step 504, virtual machine feature information, associated with the existing virtual machine group (identified in Step 502), is obtained. In one embodiment of the invention, the virtual machine feature information may include, for each virtual machine of the existing virtual machine group: an environment configuration specifying a set of hardware settings for computing hardware being emulated by the virtual machine; a product version installation chain reflecting a history or sequence of version numbers, respective to one or more versions of the given enterprise IT product, that have been installed (in chronological order) onto the virtual machine; and a set of observed upgrade issues (if any) that may have arisen or manifested following the installation of any version, reflected in the product version installation chain, of the given enterprise IT product onto the virtual machine.

In Step 506, the virtual machine feature information (obtained in Step 504) is subsequently processed or used to generate a high-dimensional analytic subspace (or analytic subspace). In one embodiment of the invention, the analytic subspace may project each virtual machine, of the existing virtual machine group (identified in Step 502), therein based on a subset of the virtual machine feature information respective to the virtual machine. Thereafter, each projected virtual machine, reflected in the analytic subspace, may be grouped into one of at least two virtual machine clusters (also referred to as upgrade prediction groups)—e.g., at least a passing virtual machine cluster (i.e., a passing group) and a failing virtual machine cluster (i.e., a failing group).

In Step 508, the customer environment, responsible for submitting the upgrade pre-test request (received in Step 500), is then projected into the analytic subspace (generated in Step 506). Specifically, in one embodiment of the invention, customer environment feature information, representative of the customer environment, may be projected into the analytic subspace. The customer environment feature information may include, but is not limited to, the customer environment configuration (received in Step 500) and a prospective post-upgrade product version installation chain. The prospective post-upgrade product version installation chain, in turn, may capture a resulting product version installation chain, for the customer environment, had the prospective product upgrade, being considered by the customer environment, been pursued and/or fulfilled. Accordingly, the prospective post-upgrade product version installation chain may be generated by appending the product version (received in Step 500) to a latest chronological end (i.e., the latest installed version of the given enterprise IT product onto the customer environment) of the customer environment product version installation chain (also received in Step 500).

Further, in one embodiment of the invention, in projecting the customer environment feature information into the analytic subspace, the customer environment may be assigned to one upgrade prediction group of the at least two upgrade prediction groups (identified in Step 506), where the one upgrade prediction group may include a subset of the virtual machines, of the existing virtual machine group (identified in Step 502), that share more feature information similarities with the customer environment than the other upgrade prediction group(s) of the at least two upgrade prediction groups. The one upgrade prediction group, to which the customer environment had been assigned, may be representative of the predicted post-upgrade outcome.

That is, in one embodiment of the invention, the predicted post-upgrade outcome (i.e., one of the at least two upgrade prediction groups) may refer to a upgrade pre-test assessment result, which may accurately foretell whether pursuing the considered product upgrade, by the customer environment, may lead to success (i.e., an issue-free installation) or failure (i.e., an issue-prone installation). The predicted post-upgrade outcome, accordingly, may serve as a recommendation advising the customer environment to either proceed in the considered product upgrade (e.g., the one upgrade prediction group=passing group) or discontinue the considered product upgrade (e.g., the one upgrade prediction group=failing group).

In Step 510, an upgrade pre-test response is generated. In one embodiment of the invention, the upgrade pre-test response may include the predicted post-upgrade outcome (i.e., the one upgrade prediction group to which the customer environment had been assigned) (identified in Step 508).

In Step 512, the upgrade pre-test response (generated in Step 510) is subsequently provided or submitted to the customer environment for consideration.

Figure 6:
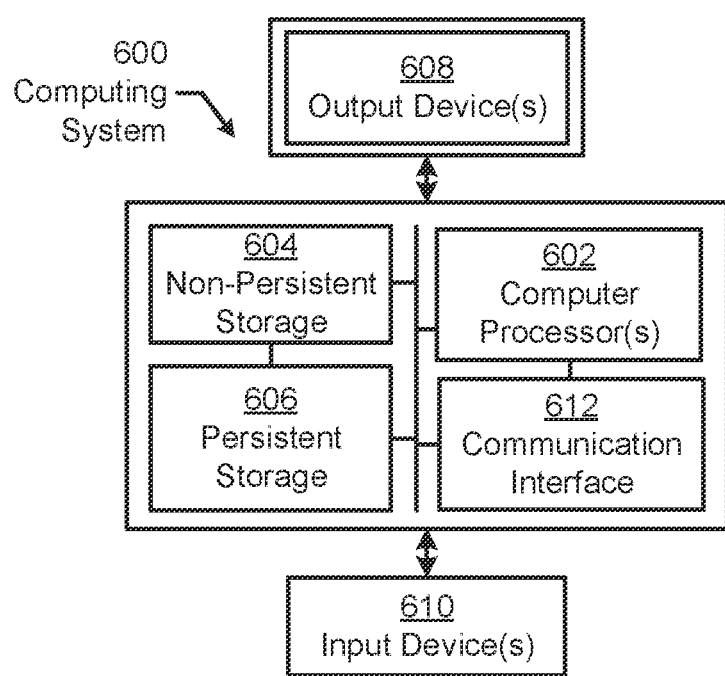
FIG. 6 shows an exemplary computing system in accordance with one or more embodiments of the invention.

FIG. 6 shows an exemplary computing system in accordance with one or more embodiments of the invention. The computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a central processing unit (CPU) and/or a graphics processing unit (GPU). The computing system (600) may also include one or more input devices (610), such as a touchscreen, keyboard, mouse, microphone, touchpad, electronic pen, or any other type of input device. Further, the communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

In one embodiment of the invention, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for predicting upgrade outcomes entailing prospective product upgrades on enterprise information technology (IT) environments, the method comprising:
   receiving an upgrade pre-test request from a customer environment, wherein the upgrade pre-test request comprises a product identifier (ID) associated with an enterprise IT product;
   identifying an existing virtual machine group mapped to the enterprise IT product, wherein identification of the existing virtual machine group comprises performing a lookup in a virtual machine group database using the product ID;
   obtaining virtual machine feature information for the existing virtual machine group, wherein the virtual machine feature information comprises:
      an environment configuration specifying a set of hardware settings for computing hardware being emulated by virtual machines of the existing virtual machine group;
      a product version installation chain reflecting a history of enterprise IT product versions, wherein the product version installation chain is specified in a product database of an analysis farm; and a set of observed upgrade issues that manifested following an installation of any of the enterprise IT product versions, wherein the observed upgrade issues comprise:
- a lack of permissions to access one or more directories;
- a lack of storage space to accommodate an upgrade installation;
- thermal rise across hardware components supporting the existing virtual machine group; and
- upgrade incompatibilities;

applying a machine learning algorithm to the virtual machine feature information to generate a high-dimensional analytic subspace, wherein the machine learning algorithm is cluster analysis;

identifying, within the high-dimensional analytic subspace, a plurality of upgrade prediction groups, wherein the plurality of upgrade prediction groups comprise a first upgrade prediction group associated with a successful installation and a second upgrade prediction group associated with a failed installation;

projecting, for the customer environment, customer environment feature information onto the high-dimensional analytic subspace to select an upgrade prediction group of the plurality of upgrade prediction groups, wherein the upgrade prediction group of the plurality of upgrade prediction groups is the first upgrade prediction group;

inferring an upgrade recommendation for the enterprise IT product, based on the upgrade prediction group, wherein the upgrade recommendation is to proceed with an upgrade associated with an upgrade pre-test request; and providing the upgrade recommendation to the customer environment.

2. The method of claim 1, wherein the computer hardware being emulated resembles a configuration of one selected from a group consisting of a customer environment and a plausible enterprise IT environment that satisfies a support matrix for the enterprise IT product.

3. The method of claim 1, wherein, for a virtual machine of the virtual machine group, the product version installation chain comprises a chronological sequence of product versions of the enterprise IT product installed on the virtual machine.

4. The method of claim 1, wherein the customer environment feature information comprises a customer environment configuration and a prospective post-upgrade product version installation chain respective to the enterprise IT product.

5. The method of claim 4, wherein the prospective post-upgrade product version installation chain comprises an up-to-date customer environment product version installation chain and a product version of the enterprise IT product to which the customer environment is considering for upgrading the enterprise IT product.

6. The method of claim 1, wherein the first upgrade prediction group comprises a subset of the virtual machine group that reflects similar virtual machine feature information conducive to an upgrade issue free installation of a product version of an enterprise IT product.

7. The method of claim 1, wherein the second upgrade prediction group comprises a subset of the virtual machine group that reflects similar virtual machine feature information conducive to an upgrade issue prone installation of a product version of an enterprise IT product.

8. A non-transitory computer readable medium (CRM) comprising computer readable program code, which when executed by a computer processor, enables the computer processor to perform a method for predicting upgrade outcomes entailing prospective product upgrades on enterprise information technology (IT) environments, the method comprising:

receiving an upgrade pre-test request from a customer environment, wherein the upgrade pre-test request comprises a product identifier (ID) associated with an enterprise IT product;

identifying an existing virtual machine group mapped to the enterprise IT product, wherein identification of the existing virtual machine group comprises performing a lookup in a virtual machine group database using the product ID;

obtaining virtual machine feature information for the existing virtual machine group, wherein the virtual machine feature information comprises:
- an environment configuration specifying a set of hardware settings for computing hardware being emulated by virtual machines of the existing virtual machine group;
- a product version installation chain reflecting a history of enterprise IT product versions, wherein the product version installation chain is specified in a product database of an analysis farm; and
- a set of observed upgrade issues that manifested following an installation of any of the enterprise IT product versions, wherein the observed upgrade issues comprise:
  - a lack of permissions to access one or more directories;
  - a lack of storage space to accommodate an upgrade installation;
  - thermal rise across hardware components supporting the existing virtual machine group; and
  - upgrade incompatibilities;

applying a machine learning algorithm to the virtual machine feature information to generate a high-dimensional analytic subspace, wherein the machine learning algorithm is cluster analysis;

identifying, within the high-dimensional analytic subspace, a plurality of upgrade prediction groups, wherein the plurality of upgrade prediction groups comprise a first upgrade prediction group associated with a successful installation and a second upgrade prediction group associated with a failed installation;

projecting, for the customer environment, customer environment feature information onto the high-dimensional analytic subspace to select an upgrade prediction group of the plurality of upgrade prediction groups, wherein the upgrade prediction group of the plurality of upgrade prediction groups is the first upgrade prediction group;

inferring an upgrade recommendation for the enterprise IT product, based on the upgrade prediction group, wherein the upgrade recommendation is to proceed with an upgrade associated with an upgrade pre-test request; and providing the upgrade recommendation to the customer environment.

9. The non-transitory CRM of claim 8, wherein the first upgrade prediction group comprises a subset of the virtual machine group that reflects similar virtual machine feature information conducive to an upgrade issue free installation of a product version of an enterprise IT product.

10. The non-transitory CRM of claim 8, wherein the second upgrade prediction group comprises a subset of the virtual machine group that reflects similar virtual machine feature information conducive to an upgrade issue prone installation of a product version of an enterprise IT product.

11. A system, the system comprising:
a customer environment; and
an analysis farm operatively connected to the customer environment, and comprising a computer processor,
wherein the computer processor is configured to perform a method for predicting upgrade outcomes entailing prospective product upgrades on enterprise information technology (IT) environments, the method comprising:
receiving an upgrade pre-test request from the customer environment, wherein the upgrade pre-test request comprises a product identifier (ID) associated with an enterprise IT product;
identifying an existing virtual machine group mapped to the enterprise IT product, wherein identification of the existing virtual machine group comprises performing a lookup in a virtual machine group database using the product ID;
obtaining virtual machine feature information for the existing virtual machine group, wherein the virtual machine feature information comprises:
an environment configuration specifying a set of hardware settings for computing hardware being emulated by virtual machines of the existing virtual machine group;
a product version installation chain reflecting a history of enterprise IT product versions, wherein the product version installation chain is specified in a product database of an analysis farm; and
a set of observed upgrade issues that manifested following an installation of any of the enterprise IT product versions, wherein the observed upgrade issues comprise:
a lack of permissions to access one or more directories;
a lack of storage space to accommodate an upgrade installation;
thermal rise across hardware components supporting the existing virtual machine group; and
upgrade incompatibilities;
applying a machine learning algorithm to the virtual machine feature information to generate a high-dimensional analytic subspace, wherein the machine learning algorithm is cluster analysis;
identifying, within the high-dimensional analytic subspace, a plurality of upgrade prediction groups, wherein the plurality of upgrade prediction groups comprise a first upgrade prediction group associated with a successful installation and a second upgrade prediction group associated with a failed installation;
projecting, for the customer environment, customer environment feature information onto the high-dimensional analytic subspace to select an upgrade prediction group of the plurality of upgrade prediction groups, wherein the upgrade prediction group of the plurality of upgrade prediction groups is the first upgrade prediction group;
inferring an upgrade recommendation for the enterprise IT product, based on the upgrade prediction group, wherein the upgrade recommendation is to proceed with an upgrade associated with an upgrade pre-test request; and
providing the upgrade recommendation to the customer environment.

* * * * *